(12) United States Patent
Taguchi et al.

(10) Patent No.: US 7,916,245 B2
(45) Date of Patent: Mar. 29, 2011

(54) DISPLAY DEVICE

(75) Inventors: Tokio Taguchi, Tenri (JP); Akiko Ito, Uji (JP); Shun Ueki, Nara (JP); Kozo Nakamura, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 268 days.

(21) Appl. No.: 12/280,878

(22) PCT Filed: Feb. 2, 2007

(86) PCT No.: PCT/JP2007/051816
§ 371 (c)(1),
(2), (4) Date: Aug. 27, 2008

(87) PCT Pub. No.: WO2007/108239
PCT Pub. Date: Sep. 27, 2007

(65) Prior Publication Data
US 2009/0141221 A1    Jun. 4, 2009

(30) Foreign Application Priority Data
Mar. 20, 2006    (JP) .................................. 2006-077732

(51) Int. Cl.
G02F 1/1335    (2006.01)
(52) U.S. Cl. ..................................................... 349/109
(58) Field of Classification Search ................... 349/109
See application file for complete search history.

(56) References Cited

U.S. PATENT DOCUMENTS

| | | | |
|---|---|---|---|
| 5,680,185 A | | 10/1997 | Kobayashi et al. |
| 5,899,550 A | * | 5/1999 | Masaki .......................... 349/109 |
| 6,049,364 A | | 4/2000 | Takahara et al. |
| 6,218,679 B1 | | 4/2001 | Takahara et al. |
| 6,738,204 B1 | * | 5/2004 | Chuang et al. ................ 359/891 |
| 7,067,985 B2 | | 6/2006 | Adachi |
| 7,163,739 B2 | | 1/2007 | Koike et al. |
| 7,248,314 B2 | * | 7/2007 | Yun ............................... 349/108 |
| 7,425,794 B2 | | 9/2008 | Adachi |

(Continued)

FOREIGN PATENT DOCUMENTS

CN    1492263 A    4/2004

(Continued)

OTHER PUBLICATIONS

Chinese Office Action and English translation thereof mailed Mar. 11, 2010 in corresponding Chinese application 200780009916.1.

(Continued)

*Primary Examiner* — Sung H Pak
(74) *Attorney, Agent, or Firm* — Nixon & Vanderhye P.C.

(57) ABSTRACT

The present invention provides a transflective display device capable of extending a color reproduction range and reducing a difference in white balance between transmissive display and reflective display. The display device of the present invention is a transflective display device including four or more filters having different colors in a pixel, each of the four or more filters having different colors including: a transmissive region for displaying an image by transmitting light from a backlight; and a reflective region for displaying an image by reflecting surrounding light, wherein at least two of the four or more filters having different colors are different in a proportion of an area of the reflective region, and the proportion of the area is represented by the following formula (1):

Proportion of area of reflective region=Area of reflective region/Effective area of filter    (1).

51 Claims, 13 Drawing Sheets

U.S. PATENT DOCUMENTS

| | | | |
|---|---|---|---|
| 7,463,319 B2 * | 12/2008 | Roh | 349/114 |
| 7,557,494 B2 | 7/2009 | Adachi | |
| 7,573,551 B2 | 8/2009 | Koma et al. | |
| 7,732,809 B2 | 6/2010 | Adachi et al. | |
| 2003/0176124 A1 | 9/2003 | Koike et al. | |
| 2004/0027672 A1 | 2/2004 | Bourdelais et al. | |
| 2004/0246414 A1 | 12/2004 | Iijima et al. | |
| 2005/0035353 A1 | 2/2005 | Adachi et al. | |
| 2005/0083453 A1 | 4/2005 | Nakano et al. | |
| 2005/0123243 A1 | 6/2005 | Steckl et al. | |
| 2005/0190323 A1 * | 9/2005 | Iijima | 349/113 |
| 2005/0237450 A1 * | 10/2005 | Hu et al. | 349/108 |
| 2005/0237451 A1 | 10/2005 | Maeda et al. | |
| 2005/0275769 A1 * | 12/2005 | Roh et al. | 349/109 |
| 2006/0028146 A1 | 2/2006 | Adachi | |
| 2007/0071970 A1 | 3/2007 | Koike et al. | |
| 2008/0007155 A1 | 1/2008 | Adachi | |
| 2008/0174727 A1 * | 7/2008 | Iijima | 349/109 |
| 2009/0072731 A1 | 3/2009 | Adachi | |
| 2010/0072880 A1 | 3/2010 | Adachi et al. | |

FOREIGN PATENT DOCUMENTS

| | | |
|---|---|---|
| CN | 1539128 A | 10/2004 |
| JP | 4-12323 | 1/1992 |
| JP | 2001-209047 | 8/2001 |
| JP | 2003-302516 | 10/2003 |
| JP | 2005-107513 | 4/2005 |
| JP | 2005-227753 | 8/2005 |
| JP | 2005-309306 | 11/2005 |
| WO | 02/101644 A2 | 12/2002 |

OTHER PUBLICATIONS

International Search Report for PCT/JP2007/051816 mailed May 1, 2007.

U.S. Appl. No. 12/380,729, filed Aug. 26, 2008; Ito et al.

International Search Report for PCT/JP2006/326273 mailed Feb. 13, 2007.

CN Office Action and English translation thereof mailed Sep. 25, 2009 in corresponding Chinese application 2006800535594.

* cited by examiner

DISPLAY DEVICE

This application is the U.S. national phase of International Application No. PCT/JP2007/051816 filed 2 Feb. 2007 which designated the U.S. and claims priority to Japanese Patent Application No. JP 2006-077732 filed 20 Mar. 2006, the entire contents of each of which are hereby incorporated by reference.

TECHNICAL FIELD

The present invention relates to a display device. More specifically, the present invention relates to a transflective display device which displays images in both of a transmissive region and a reflective region.

BACKGROUND ART

Currently, liquid crystal display devices are used widely in electronic apparatuses such as a monitor, a projector, a mobile phone and a Personal Digital Assistant (hereinafter, also referred to as a "PDA"). Such liquid crystal display devices are classified into reflective, transmissive, and transflective (semi-transmissive) types. The reflective liquid crystal display device is configured to obtain display light by guiding surrounding light to the inside of a liquid crystal display panel and reflecting this light by a reflective member. Furthermore, the transmissive liquid crystal display device is configured to obtain display light by guiding light from a light source (hereinafter, also referred to as a "backlight") arranged on the back surface side of a liquid crystal display panel and emitting the light to the outside through the panel.

According to the transflective liquid crystal display device, transmissive display using light from the backlight is mainly observed under relatively dark environments such as indoor environment. Under relatively bright environments such as outdoor environment, reflective display using surrounding light is mainly observed. As a result, the transflective liquid crystal display device can perform display with a high contrast ratio regardless of surrounding brightness. That is, the transflective liquid crystal display device can perform display under all environments regardless of indoor and outdoor environments, and therefore such a device has been often equipped with mobile devices such as a cellular phone, a PDA, and a digital camera.

According to such a transflective liquid crystal display device, the liquid crystal panel has two different display regions: a reflective region; and a transmissive region. In the transmissive region, light from the backlight passes through a liquid crystal layer and a color filter only one time and then the light is emitted to the outside. In the reflective region, surrounding light passes through the color filter and the liquid crystal layer, and the light is reflected by a reflective member and further passes through the liquid crystal layer and the color filter again. Then, the light is emitted to the outside. Thus, the transmissive region and the reflective region use different light sources, that is, backlight and surrounding light, thereby generating display light. In addition, a color reproduction range in the transmissive display is obtained by causing light to enter the color filter only one time. A color reproduction range in the reflective display is obtained by causing light to enter the color filter twice.

Color filters used in a conventional liquid crystal display device are filters having three primary colors of red, green, and blue. A color of light emitted from each color is expressed by additive color mixture of three primary colors of red, green, and blue. However, by using only these three primary colors, the color reproduction range is limited. Therefore, not all colors which can be recognized by human eyes can be expressed. Four or more filters having different colors have been proposed in order to extend the color reproduction range and improve use efficiency of light. For example, the Patent Document 1 discloses a color filter including four colors consisting of yellow in addition to the three primary colors of red, green, and blue (hereinafter, also referred to as four filters having different colors). With respect to these four colors, blue and yellow are in a complementary color relationship, and red and green, and blue and yellow are pairs of opposite colors based on human visual characteristics.

White balance is mentioned as one of important display performances of the display device. This white balance is a color tone of white displayed by a display device, and mainly determined by a color tone of a light source and a configuration of a color filter. This white balance is often expressed as a color temperature (an absolute temperature of a black body having the same or almost the same chromaticity as a chromaticity of a certain light) quantitatively, and generally, a display for displaying TV images and the like needs a color temperature of 6500 K or more.

If the four filters having different colors are used as the color filter of the liquid crystal display device, the color reproduction range can be extended or the luminance can be improved. However, the white balance is significantly affected. For example, in a liquid crystal display device including a light source which corresponds spectral characteristics of filters having three primary colors, if four filters having different colors are used instead of the filters having three primary colors, the color temperature of the color filter is reduced, and thereby the white balance is shifted and white displayed by the display device becomes yellowish white.

The white balance in the transmissive display can be improved by adjusting the color tone of the light source in the backlight because the backlight is used as the light source. In the reflective display using surrounding light as the light source, however, it is difficult to improve the white balance. Even if the white balance in the transmissive display is improved, a large difference in white balance is generated between the transmissive display and the reflective display.

A method of previously adjusting the configuration of the four filters having different colors, thereby obtaining an optimal white balance in the reflective display, is mentioned. For example, a method of extremely decreasing the thickness of the blue filter, thereby increasing contribution of blue that is a complementary color of yellow, is mentioned. However, even if the thickness of the blue filter is reduced, white free from a yellow tinge is not obtained. Further, if such a design modification is performed, a color purity of blue is reduced. As a result, a large difference is generated between a display color and a color obtained using the three filters having different colors in accordance with NTSC (National Television System Committee) standard.

[Patent Document 1]
Japanese Kokai Publication No. 2001-209047

DISCLOSURE OF INVENTION

The present invention has been made in view of the above-mentioned state of the art. The present invention has an object to provide a transflective display device capable of extending the color reproduction range and reducing a difference in white balance between the transmissive display and the reflective display.

The present inventors made various investigations of a transflective display device including four or more filters having different colors in a pixel, each of the four or more filters having different colors including: a transmissive region for displaying an image by transmitting light from a backlight; and a reflective region for displaying an image by reflecting surrounding light. The inventors noted a proportion of an area of the reflective region ($R_{AR}$) in an effective area of the filter ($EF_{AR}$), that is, a proportion of the area of the reflective region in the filter ($R_{AR}/EF_{AR}$). Then, the inventors found the followings. For example, as in a conventional embodiment shown in FIG. 9, in the case where the proportion of the area of the reflective region ($R_{AR}/EF_{AR}$) is the same among all of the filters having different colors arranged in the same pixel, when four or more filters having different colors are arranged in the pixel to extend the color reproduction range, the white balance can be adjusted and optimized by adjusting a color tone of a light source in a backlight, with regard to the transmissive display. However, with regard to the reflective display, surrounding light is used as the light source and therefore, the white balance can not be optimized by this method. Therefore, white with a tinge of some kind of color is displayed. Then, the inventors found the followings. If at least two of the four or more filters having different colors, arranged in the same pixel, are different in the proportion of the area of the reflective region ($R_{AR}/EF_{AR}$), the amount of reflective light can be adjusted in each filter and therefore the white balance in the reflective display can be adjusted. Thus, the inventors found that the difference in white balance between the transmissive display and the reflective display can be reduced. Thereby, the above-mentioned problems have been admirably solved, leading to completion of the present invention.

That is, the present invention relates to a transflective display device including four or more filters having different colors in a pixel, each of the four or more filters having different colors including: a transmissive region for displaying an image by transmitting light from a backlight; and a reflective region for displaying an image by reflecting surrounding light, wherein at least two of the four or more filters having different colors are different in a proportion of an area of the reflective region, and the proportion of the area is represented by the following formula (1):

Proportion of area of reflective region=Area of reflective region/Effective area of filter (1)

(hereinafter, also referred to as "the first display device")

The present invention is mentioned below in more detail.

According to the first display device of the present invention, four or more filters having different colors are arranged in a pixel. In the present description, the "four or more filters having different colors" means that four or more filters which are different in at least hue (kind of color) among the three attributes of color are arranged. The filter means one which selectively transmits visible light within a specific wavelength range more than visible light in other wavelength ranges. A film which has a uniform transmittance at each wavelength of visible light (a so-called achromatic film) is not included as the filter. The material for the filter is not especially limited. Examples thereof include a resin stained by a dye, a resin into which a pigment is dispersed, and a material obtained by solidifying a fluid material (ink) into which a pigment is dispersed. The method of forming the filter is not especially limited. Examples thereof include a dyeing method, a pigment dispersion method, an electrodeposition method, a printing method, an ink-jet method, and a method of using a colored photosensitive material (also referred to as a "transfer method", "dry film laminate (DFL) method", or "dry film resist method"). In the present description, the pixel means the minimum unit for displaying an image. The pixel is generally composed of sub-pixels in each filter region. Therefore, the pixel in accordance with the display device (the first to fifth display devices) of the present invention is composed of sub-pixels having three or more colors. In the present invention, all of the filters arranged in one pixel are also referred to as a color filter.

The first display device of the present invention can perform display with a large color reproduction range because the four or more filters having different colors, which have different spectral characteristics, are arranged in the pixel. The array pattern of the filters is not especially limited. Examples thereof include a stripe pattern, a delta pattern, and a mosaic pattern. The configuration of the filters is not especially limited. For example, if the filters are arrayed in a stripe pattern, filters having the same color are formed together between pixels which are adjacently arranged in the same column (vertical direction). In the present description, the "filter" generally means a filter included in one pixel regardless of the configuration. For example, in an embodiment in which one ink-receiving layer is arranged in the pixel and stained with inks having different colors, the "filter" means each portion stained with the different inks. The number of the filters which are arranged in one pixel is not especially limited. A plurality of filters having the same color may be arranged in one pixel, but it is referable that a plurality of filters having different colors are arranged in one pixel in terms of aperture ratio.

Between the above-mentioned filters (between the sub-pixels and between the pixels), it is preferable that a shielding member such as black matrix (BM) is arranged in order to prevent Light leakage between the filters. If the filters are formed by an ink-jet method, a printing method, and the like, a bank (projective structure, wall for preventing color mixing) may be disposed between the filters to prevent mixing of inks having different colors. If the bank has no shielding property, it is preferable that a shielding member is further arranged between the filters.

In the present description, the shielding member means a member for substantially completely shielding visible light. Specifically, the shielding member means a member which has a transmittance of less than 1% (an OD value of more than 2) and which has 10% or less of a luminous reflectance (including surface reflection) of incident light from the side where a person observes the panel at the entire visible wavelength of 380 to 780 nm. It is preferable that the transmittance of the shielding member is 0.1% or less (the OD value is 3 or more) at the entire visible wavelength of 380 to 780 nm. It is preferable that the reflectance to incident light from the panel surface side is 5% or less (including surface reflection) at the entire visible wavelength of 380 to 700 nm. The material for the shielding member is not especially limited. Chromium, chrome oxide, acrylic resin (e.g. photosensitive resin) into which black pigment is dispersed, and the like, are mentioned. However, the acrylic resin into which black pigment is dispersed is preferable in terms of environment. The black pigment is not especially limited, and carbon fine particles, chromium or titanium black pigment, and the like, may be mentioned. As a method of forming the shielding member, the same method as the method of forming the filter may be mentioned although depending on the material for the shielding member. The configuration of the shielding member is not especially limited as long as the entire shielding member has the above-mentioned optical characteristics. For example, a BM composed of stacked filters having different colors may be mentioned.

The color combination of the above-mentioned three or more filters having different colors is not especially limited. However, it is preferable that at least three primary colors of red, green, and blue are included in order to reproduce a color equal to a color in accordance with NTSC standard. Further, in order to effectively extend the color reproduction range, it is preferable that yellow, cyan, magenta, and the like, are included. In the present description, the red is a color having a dominant wavelength of 597 nm or more and 780 nm or less in an xy chromaticity diagram in an XYZ color system (CIE 1931 standard colorimetric system), and preferably 600 nm or more and 635 nm or less. The yellow is a color having a dominant wavelength of 558 nm or more and less than 597 nm, and preferably 565 nm or more and 582 nm or less. The green is a color having a dominant wavelength of 510 nm or more and less than 558 nm, and preferably 520 nm or more and 557 nm or less. The cyan is a color having a dominant wavelength of 472 nm or more and less than 510 nm, and preferably 475 nm or more and 503 nm or less. The blue is a color having a dominant wavelength of 380 mm or more and less than 472 nm, and preferably 470 nm or less. The magenta is a color having a complementary dominant wavelength of 495 nm or more and less than 565 nm, and preferably 502 nm or more and 558 nm or less. In addition, with regard to the color purity of each color, the following values are preferable: 70% or more in red; 45% or more and 80% or less in green; 70% or more and 95% or less in blue; and 65% or more and 95% or less in yellow; and 45% or more and 80% or less in cyan; and 40% or more and 80% or less in magenta. The dominant wavelength and complementary dominant wavelength broadly express a hue. The color purity broadly expresses a chroma. The color purity is measured in the following manner: chromaticity coordinates of each filter when each light source is used are measured with a spectroradiometer and the like; and then, the color purity is calculated base on chromaticity coordinates of a white point, chromaticity coordinates of the respective filters, and chromaticity coordinates at a point where a line connecting the chromaticity coordinates of the white point and chromaticity coordinates of the respective filters crosses a spectrum locus. In the present description, a white point of the light source $D_{65}$ is defined as a standard white point, and based on the standard white point, the value of the color purity is expressed.

The first display device of the present invention generally includes a liquid crystal display panel in which a light crystal layer is imposed between a TFT array substrate and a counter substrate. The above-mentioned four or more filters having different colors are generally arranged on the counter substrate side. However, according to this configuration, if the TFT substrate and the counter substrate are misaligned and attached, the aperture ratio is reduced. Therefore, in order to prevent such a reduction in aperture ratio, the filters may be arranged on the TFT array substrate side (CF on Array). Alternatively, the TFT array may be arranged on the filters (TFT on CF). Similarly to the four or more filters having different colors, the shielding member such as a BM is generally arranged on the counter substrate side. However, it may be arranged on the TFT array substrate side (BM on Array).

The first display device of the present invention includes, in each filter, a transmissive region for displaying an image by transmitting light from a backlight and a reflective region for displaying an image by reflecting surrounding light. That is, the first display device of the present invention is a transflective (semi-transmissive) display device, and therefore it can perform both of transmissive display for displaying an image by transmitting light from a backlight and reflective display for displaying an image by reflecting surrounding light. According to the first display device of the present invention, the transmissive region and the reflective region are arranged in each of the four or more filters having different colors. Therefore, in the both of the transmissive display and the reflective display, the color reproduction range can be effectively extended.

The above-mentioned transmissive region means a region used for transmissive display, and in this region, a transparent conductive member for applying a voltage to the liquid crystal layer is formed on each of the TFT array substrate and the counter substrate constituting the liquid crystal display panel. The transparent conductive member on the TFT array substrate side is generally formed in each filter (sub-pixel) region, that is, over the entire region of the transmissive region and the reflective region of the filter. The transparent conductive member on the counter substrate side is generally formed as an electrode common to every pixel. The material for the transparent conductive member is not especially limited, and indium tin oxide (ITO) and the like are mentioned. The backlight is not especially limited, and a direct or edge type one may be used. The light source in the backlight is not especially limited, but a light source which has a light emission spectrum corresponding to the spectral characteristics of the filters is preferable in order to optimize the white balance in the transmissive display. For example, alight emitting diode (LED), a cold cathode fluorescent tube (CCFT), a hot cathode fluorescent tube (HCFT), and the like, may be used.

The above-mentioned reflective region means a region used for reflective display. In this region, a reflective member and a transparent conductive member are formed on the TFT array substrate side constituting the liquid crystal panel, if necessary, and the transparent conductive member is formed on the counter substrate side. In the present description, the reflective member means a member which substantially completely reflects visible light and specifically has a reflectance of 70% or more in the entire visible light wavelength of 380 to 780 nm. The reflectance of the reflective member is preferably 80% or more at the entire visible light wavelength of 380 to 780 nm. The material for the reflective member is not especially limited. Aluminum, silver, an alloy of these metals, and the like, may be mentioned. An aluminum, chromium, tungsten, and the like, which has a broad reflectance at the entire visible light wavelength, are preferably used. The reflective member may have a function as an electrode for applying a voltage to the liquid crystal layer. The reflective member is also referred to as a reflective electrode if it functions as an electrode. If the reflective member does not function as an electrode, it is preferable that an electrode is additionally arranged in the reflective region. The transparent conductive member serves as the reflective electrode, generally. The reflective member may be processed to have an uneven surface, thereby being provided with a light-scattering property in order to improve the use efficiency of light, or may have a mirror surface. It is preferable that a light-scattering layer is additionally arranged if the reflective member has a mirror surface. The light-scattering layer may be used additionally even if the reflective member has the light-scattering property.

In the above-mentioned reflective region, a projective member (hereinafter, also referred to as a "multi-gap layer") is formed to make the thickness of the liquid crystal layer in the reflective region smaller than the thickness of the liquid crystal layer in the transmissive region. The multi-gap layer may be arranged on the TFT array substrate side or the counter substrate side. It is preferable that the multi-gap layer is arranged on the counter substrate side in order to increase the aperture ratio. The material for the multi-gap layer is not especially limited. If the multi-gap layer is arranged on the observation surface side relative to the reflective member, the optical characteristics of the multi-gap layer have an influence on display qualities of the reflective display. Therefore, it is preferable that the material for the multi-gap layer is appropriately selected. It is preferable that the thickness of the multi-gap layer is substantially half the thickness of the liquid crystal layer in the transmissive region (hereinafter, also referred to as a "cell thickness"), in order to uniform an optical path length in the reflective region and an optical path length in the transmissive region.

The display device of the present invention may includes a so-called front light and use it for reflective display, together with surrounding light.

According to the first display device of the present invention, at least two of the four or more filters having different colors are different in the proportion of the area of the reflective region, represented by the above formula (1). According to this, the white balance in the reflective display can be adjusted by adjusting the proportion of the area of the reflective region in each filter in accordance with spectral characteristics of the filters. Therefore, the white balance in the reflective display can be optimized. Further, the white balance in the transmissive display can be adjusted by adjusting a color temperature of the light source in the backlight or a cell thickness in the transmissive region, and the like. Therefore, a difference in the white balance between the transmissive display and the reflective display can be reduced.

The effective area of the filter, shown in the right-hand denominator in the above formula (1), means an area of a region which can be used in the transmissive display and the reflective display in the region where the filter is arranged. The effective area ($EF_{AR}$) of the filter is determined in each color of the filter. If one filter of each color is arranged in one pixel, the effective area is determined in each filter. Generally, the effective area ($EF_{AR}$) of the filter can be measured by subtracting an area ($O_{FB}$) of a region where the filter overlaps with a shielding member forming a contour of a sub-pixel from an area ($F_{AR}$) of a region (hereinafter, also referred to as an "effective region") where the filter overlaps with a transmissive electrode and a reflective electrode. For example, as shown in FIGS. 1(a) and 1(b), if a filter 5a is arranged between black matrixes (bank BMs) 10BM which function also as a bank and have a vertical side surface, there is no region where the filter 5a overlaps with the black matrix 10BM ($O_{FB}$=0). The area ($F_{AR}$) of the effective region in the filter 5a itself can be defined as the effective area ($EF_{AR}$) in the filter 5a ($EF_{AR}=F_{AR}$). Further, an area calculated by subtracting an area ($O_{FB}$) where the effective region in the filter 5a overlaps with the black matrix 10BM from an area ($F_{AR}$) of the effective region in the filter 5a can be regarded as the effective area ($EF_{AR}$) in the fitter 5a ($EF_{AR}=F_{AR}-O_{FB}$) in the following cases: as shown in FIGS. 2(a) and 2(b) the filter 5a is arranged between the black matrixes 10 BM having an inclined surface; as shown in FIGS. 3(a) and 3(b), the bank 9 is formed on the black matrix 10BM and the filter 5a is formed between the banks 9; and as shown in FIGS. 4(a) and (b), the filter 5a is formed between the banks 9, and the black matrix 10BM is formed to cover the bank 9. As shown in FIGS. 5(a) and 5(b), if a BM formed by stacking filters having different colors (color-stacking BM) is formed between the filters, an area calculated by subtracting an area ($O_{FF}$) of the color-stacking BM from an area ($F_{AR}$) of the effective region in the filter 5a per pixel ($EF_{AR}=F_{AR}-O_{FF}$).

As long as the proportion of the area of the reflective region satisfies the above-mentioned conditions, the effective area of the above-mentioned filter may be the same among all of the filters or between any two of the filters, or may be different among all of the filters. If a plurality of filters having the same color are arranged in one pixel, the sum of the areas of the reflective regions in the plurality of filters having the same color is the area of the reflective region in the filter of the color. Further, the sum of the effective areas of the plurality of filters having the same color is the effective area of the filter of the color. That is, if a plurality of filters having the same color are arranged in one pixel, the sum of the proportions of the areas of the reflective regions in the plurality of filters having the same color is regarded as the proportion of the area of the reflective region.

The area of the reflective region shown in the right-hand numerator in the above formula (1) means an area of a region which can be used for the reflective display in the region where the filter is arranged. The area ($R_{AR}$) of the reflective region is determined in each color of the filter. If one filter of each color is arranged in one pixel, the area is determined in each filter. The area ($R_{AR}$) of the reflective region is generally expressed as an area of a region where the filter overlaps with a reflective member (reflective electrode) in the effective region of the filter.

As long as the proportion of the area of the reflective region ($R_{AR}/EF_{AR}$) satisfies the above-mentioned conditions, the above-mentioned area ($R_{AR}$) of the reflective region may be the same among all of the filters having different colors or between any two of the filters, or may be different among all of the filters having different colors. If a plurality of filters having the same color are arranged in one pixel, the sum of the areas of the reflective regions of the plurality of filters having the same color is regarded as an area ($R_{AR}$) of the reflective region of the filter of the color.

In all of the filters having different colors, the above-mentioned proportion of the area of the reflective region ($R_{AR}/EF_{AR}$) is larger than 0 and smaller than 1. For example, the preferable proportion of the area of the reflective region will be 0.50 to 1.00 in reflective-conscious or reflective display device and it will be substantially 0.30 or less in a semi-reflective display device. As long as the above-mentioned proportion of the area of the reflective region is different between at least two filters having different colors, filters having the same proportion of the area of the reflective region may be arranged in the same pixel. If the proportion of the area of the reflective region is different, it is preferable that the proportion of the area is different by 0.05 to 0.80. If the difference in the proportion of the area of the reflective region is less than 0.05, the white balance in the reflective display might not be adjusted. If the difference is more than 0.80, the white balance in the transmissive display might not be obtained.

The first display device of the present invention may or may not include other components as long as it includes the above-mentioned configuration. The configuration of the first display device is not especially limited. The first display device of the present invention is characterized by that at least two of the four or more filters having different colors are different in the proportion of the area of the reflective region, represented by the above formula (1). However, between such at least two filters, the relationship of the proportion of the area of the transmissive region represented by the following formula (5) is not especially limited. Accordingly, the present invention also includes the following configuration in which in at least two filters having different colors, which differ in the proportion of the area of the reflective region, the relationship of the proportion of the area of the transmissive region is substantially the same as the relationship of the proportion of the area of the reflective region, and a light source for the transmissive display (light source in the backlight) which has spectral characteristics similar to those of the light source for the reflective display (surrounding light), for example, a standard light source $D_{65}$, is used. Also according to this configuration, the white balance in the reflective display is adjusted and simultaneously the difference in white balance between the transmissive display and the reflective display can be reduced. The above-mentioned "the relationship of the proportion of the area of the transmissive region is substantially the same as the relationship of the proportion of the area of the reflective region" means the followings: if "the proportion of the area of the reflective region in the first filter": "the proportion of the area of the reflective region in the second filter" is X1:Y1 (X1≠Y1), "the proportion of the area of the transmissive region in the first filter":"the proportion of the area of the transmissive region in the second filter" is X1:Y1.

However, if the relationship of the area of the transmissive region is substantially the same as the relationship of the proportion of the area of the reflective region, a region (shielding part and the like) which has no contribution to display might be generated in a sub-pixel, which is not preferable in terms of aperture ratio. Accordingly, a light source which has optical characteristics different from those of the standard light source $D_{65}$ and the like is preferably used as the light source in the backlight, and more preferably, a light source having a higher color temperature (having stronger blue) than that of the standard light source $D_{65}$ is used. That is, in order to effectively reduce the difference in the white balance between the transmissive display and the reflective display, it is preferable in the pixel that between at least two filters having different colors, the relationship of the proportion of the area in the reflective region is different from the relationship of the proportion of the area in the transmissive region. Specifically, if the same light source is used to perform white display, it is preferable that white displayed in the reflective region has a color temperature higher than a color temperature of white displayed in the transmissive region. According to this, the aperture ratio is sufficiently secured and simultaneously the white balance can be more effectively optimized in each of the reflective display and the transmissive display.

Preferable embodiments of the first display device of the present invention are mentioned below in more detail.

It is preferable in the first display device that a shielding film is arranged to overlap with a part of at least one of the four or more filters having different colors, the at least two filters having different colors are different in a proportion of an area of the shielding film, and the proportion of the area is represented by the following formula (2):

Proportion of area of shielding film=Area of shielding film arranged to overlap with a part of filter/Effective area of filter        (2).

According to this, the proportion of the area of the shielding film arranged to overlap with a part of the filter (hereinafter, also referred to as "the first area proportion of the shielding film") is adjusted in accordance with spectral characteristics of the filter. As a result, the area proportion of the reflective region in the filter can be easily adjusted. Therefore, the white balance in the reflective display can be easily optimized.

In the present description, the shielding film means a film with a shielding property, which is arranged in a sub-pixel to adjust the area proportion of the reflective region, represented by the above formula (1), in each filter. Accordingly, optical characteristics equal to those of the shielding member forming the contour of the sub-pixel are needed for the shielding film. Therefore, it is preferable that the shielding film is made of the same material as in the shielding member. Further, in order not to complicate the production steps, it is preferable that the shielding film is formed integrally with the shielding member. If the shielding film and the shielding member are integrally formed, the part arranged in the sub-pixel corresponds to the shielding film and the part forming the contour of the sub-pixel corresponds to the shielding member.

When the effective area ($EF_{AR}$) of the filter, which is the right-hand denominator in the above formula (2), is calculated, an area ($O_{FB}$) of a region where the filter overlaps with the shielding member is subtracted from the effective region ($EF_{AR}$) of the filter, as mentioned above. With regard to the area ($O_{FB'}$) of the shielding film which is arranged to overlap with a part of the filter, the region where the shielding film is arranged is regarded as a region which can not be used for the transmissive display and the reflective display but constitutes the effective area ($EF_{AR}$) of the filter.

The above-mentioned first area proportion of the shielding film is 0 or more and less than 1 in all of the filters having different colors. The first area proportion of the shielding film is preferably 0 to 0.70. Filters having the same first area proportion of the shielding film may be arranged in the same pixel as long as the first area proportion of the shielding film is different between at least two filters having different colors.

As long as the first area proportion of the shielding film satisfies the above-mentioned conditions, the above-mentioned area of the shielding film arranged to overlap with a part of the filter may be the same among all of the filters having different colors or between any two of the filters, or may be different among all of the filters having different colors. If a plurality of shielding films are arranged in one sub-pixel, the sum of the areas of the plurality of shielding films is regarded as an area of the shielding film which is arranged to overlap with a part of the filter.

It is preferable that the shielding film is arranged to overlap with a part of the reflective region in the filter in order to sufficiently secure the aperture ratio of the transmissive region and adjust only the proportion of the area of the reflective region.

It is preferable in the above-mentioned first display device that a shielding film is arranged instead of a part of at least one of the four or more filters having different colors, the at least two of the four or more filters having different colors are different in a proportion of an area of the shielding film, and the proportion of the area is represented by the following formula (3):

Proportion of area of shielding film=Area of shielding film arranged instead of a part of filter/Effective area of filter        (3).

According to this, the proportion of the area of the shielding film arranged instead of a part of the filter (hereinafter, also referred to as "the second area proportion of the shielding film") is adjusted in accordance with spectral characteristics of the filter. As a result, the proportion of the area of the reflective region in the filter can be easily adjusted. Therefore, the white balance in the reflective display can be optimized.

The region where the shielding film is arranged is not used for the transmissive display and the reflective display. However, when the effective area ($EF_{AR}$) of the filter, shown in the right-hand denominator in the above formula (3) is calculated, an area ($O_{FB''}$) of the shielding film arranged instead of a part of the filter is also regarded as a region which constitutes the effective area ($EF_{AR}$) of the filter.

The above-mentioned second area proportion of the shielding film is also 0 or more and less than 1 in all of the filters having different colors. The second area proportion of the shielding film is preferably 0 to 0.70. Filters having the same second area proportion of the shielding film may be arranged in the same pixel as long as the second area proportion of the shielding film is different between at least two of the four or more filters having different colors.

As long as the second area proportion of the shielding film satisfies the above-mentioned conditions, the area of the above-mentioned shielding film arranged instead of a part of the filter may be the same among all of the filters having different colors or between any two of the filters, or may be different among all of the filters having different colors. If a plurality of shielding films are arranged in one sub-pixel, the sum of the areas of the plurality of shielding films is an area of the shielding film which is arranged instead of a part of the filter.

It is preferable that the shielding film is arranged instead of a part of the reflective region in the filter in order to sufficiently secure the aperture ratio of the transmissive region and simultaneously adjust only the proportion of the area of the reflective region.

It is preferable in the first display device that a reflective member is arranged in each of the four or more filters having different colors, an area ratio of the reflective member to a transmissive electrode is different between the at least two of the four or more filters having different colors, and the area ratio is represented by the following formula (4):

$$\text{Area ratio of reflective member to transmissive electrode} = \text{Area of reflective member}/\text{Area of transmissive electrode} \quad (4).$$

According to this, the area ratio of the reflective member corresponding to the filter can be adjusted in accordance with spectral characteristics of the filter, and thereby the proportion of the area of the reflective region in the filter, represented by the above formula (1), can be adjusted. As a result, the white balance in the reflective display can be optimized.

The above-mentioned reflective member is formed in the reflective region in the filter to display an image by reflecting surrounding light. The reflective member is generally formed in each filter (sub-pixel) region on the TFT array substrate side. The reflective member may be a reflective electrode for applying a voltage to the liquid crystal layer. The above-mentioned transmissive electrode means a transparent conductive member for applying a voltage to the liquid crystal layer. The transmissive electrode is generally formed in each filter (sub-pixel) region on the TFT array substrate side.

It is preferable in the first display device that a red filter, a green filter, a blue filter, and a yellow filter are arranged in the pixel. Thus, if the first display device has a configuration in which a yellow filter is added to the filters having three primary colors of red, green, and blue, in both of the transmissive display and the reflective display, a high NTSC standard ratio is secured and simultaneously extension of the color reproduction range and improvement in the luminance can be more effectively achieved.

It is preferable that the yellow filter has a smaller proportion of the area of the reflective region, represented by the formula (1), than that of any one of the other filters. Generally, surrounding light used as a light source for the reflective display has a color temperature lower than a color temperature of a light source in a backlight used as a light source for the transmissive display. If the filter in the reflective region has the same configuration as in the filter in the transmissive region, white in the reflective display has a yellow tinge. Accordingly, the proportion of the area of the reflective region in the yellow is relatively reduced, and thereby white in the reflective display can be suppressed from having a yellow tinge.

In order to more suppress white in the reflective display from having a yellow tinge, it is preferable that the yellow filter has a smaller proportion of the area of the reflective region than that of at least the blue filter that is a complementary color of yellow. More preferably, the yellow filter has a smaller proportion of the area of the reflective region than that of the green filter. Still more preferably, the yellow filter has the smallest proportion of the area of the reflective region among all of the filters.

It is preferable that the yellow filter is arranged adjacent to the blue filter, and an area of the reflective region in the blue filter is extended toward the reflective region in the yellow filter. According to this, the reflective region in the blue filter can be extended without decreasing the transmissive region in the blue filter. Therefore, there is no need to further adjust a spectrum of the backlight (to enhance blue) in order to maintain the white balance in the transmissive display. As a result, a reduction in luminance in the transmissive display can be suppressed.

The following embodiments may be mentioned as the above-mentioned embodiment in which the yellow filter has a smaller proportion of the area of the reflective region, represented by the above formula (1), than that of any one of the other filters: (A) an embodiment in which the yellow filter has substantially the same proportion of an area of the transmissive region as that of each of the other filters, and the proportion of the area is represented by the following formula (5); and (B) an embodiment in which the yellow filter has the largest proportion of the area of the transmissive region among all of the filters, and the proportion of the area is represented by the following formula (5):

$$\text{Proportion of area of transmissive region} = \text{Area of transmissive region}/\text{Effective area of filter} \quad (5).$$

According to the above-mentioned embodiment (A), the white balance in the transmissive display can be easily adjusted because the proportion of the area of the transmissive region is substantially the same among all of the filters having different colors, as in the conventional embodiment where each of the proportion of the area of the transmissive region and the proportion of the area of the reflective region is the same among all of the filters having different colors. According to the above-mentioned embodiment (B), the yellow filter has a large proportion of the area of the transmissive region in comparison to conventional embodiments. Therefore, white in the transmissive display might have a yellow tinge. However, the white balance in the transmissive display can be optimized by adjusting a color temperature of the light source in the backlight, and the like. Therefore, the white balance in the transmissive display is properly maintained and simultaneously bright transmissive display can be performed.

That is, the above-mentioned embodiment (A) is an embodiment in which the proportion of the area of the transmissive region is substantially the same among all of the filters having different colors arranged in the same pixel. Preferable examples of the embodiment (A) include an embodiment (A-1) in which the shielding film is arranged to overlap with a part of the yellow filter, thereby shielding a part of the reflective region in the yellow filter and an embodiment (A-2) in which the shielding film is arranged instead of a part of the yellow filter, thereby reducing the reflective region in the yellow filter. These embodiments can be obtained by adding the shielding film or modifying the design of the shielding member. Therefore, such embodiments are preferable in that neither patterning of the electrode nor modification of the light source in the backlight and the like are needed. According to the embodiment (A-2), the shielding film may be formed integrally with the shielding member forming the contour of the yellow filter.

Preferable examples of the above-mentioned embodiment (B) include the following embodiment: a conventional embodiment, in which each of the proportion of the area of the transmissive region and the proportion of the area of the reflective region is the same among all of the filters having different colors, is improved in that the transmissive region in the yellow filter is extended toward the reflective region in the yellow filter, thereby reducing the area of the reflective member in the yellow filter. In order to achieve this embodiment, patterning of the electrode or modification of the light source in the backlight is needed. However, this embodiment is preferable in that the luminance in the transmissive display can be effectively obtained.

It is preferable that the blue filter has the largest proportion of the area of the reflective region, represented by the formula (1), among all of the filters. That is, it is preferable that the above-mentioned proportion of the area of the reflective region in the blue filter is larger than that of each of the yellow, red, and green filters. According to this, in the reflective display, the proportion of the area of the reflective region in the blue filter that is a complementary color of yellow is increased, thereby increasing the color temperature of white in the reflective display. As a result, the white balance in the reflective display can be effectively optimized. Further, the proportion of the area of the reflective region in the blue filter is increased, thereby increasing the proportion of the area of the reflective region in the yellow filter which is a complementary color of blue and has a high luminance. As a result, the white balance in the reflective display can be properly adjusted, and the luminance in the reflective display can be effectively increased.

It is preferable that the red filter has a smaller proportion of the area of the reflective region, represented by the formula (1), than that of each of the green and blue filters. According to this configuration (hereinafter, also referred to as an "embodiment (C)"), in the reflective display, the proportion of the area of the reflective region in the red filter having a relatively low color temperature is reduced, thereby effectively optimizing the white balance in the reflective display. According to the above-mentioned embodiment (C), an embodiment in which the red filter has substantially the same proportion of the area of the transmissive region as that of the green filter, and the proportion of the area is represented by the above formula (5) and an embodiment in which the red filter has a larger proportion of the area of the transmissive region than that of the green filter, and the proportion of the area is represented by the following formula (5).

Preferable embodiments of the above-mentioned embodiment (C) include an embodiment (C-1) in which the shielding film is arranged to overlap with a part of the red filter, thereby shielding a part of the reflective region in the red filter and an embodiment (C-2) in which the shielding film is arranged instead of a part of the red filter, thereby reducing the reflective region in the red filter. These embodiments can be obtained by adding the shielding film or modifying the design of the shielding member. Therefore, such embodiments are preferable in that neither patterning of the electrode nor modification of the light source in the backlight and the like are needed. According to the embodiment (C-2), the shielding film may be formed integrally with the shielding member forming the contour of the red filter. In order to more effectively optimize the white balance in the reflective display, it is preferable that the red filter has a larger proportion of the area of the reflective region, represented by the above formula (1), than that of the yellow filter and also preferable that the red filter has a smaller proportion of the area of the reflective region, represented by the above formula (1), than that of each of the green and blue filters.

Preferable examples of the above-mentioned embodiment (C) include an embodiment (C-3). According to the embodiment (C-3), a conventional embodiment, in which each of the proportion of the area of the transmissive region and the proportion of the area of the reflective region is the same among all of the filters having different colors, is improved in that the transmissive region in the red filter is extended toward the reflective region in the red filter, thereby reducing the area of the reflective member in the red filter. In order to achieve this embodiment, patterning of the electrode or modification of the light source in the backlight is needed. However, this embodiment is preferable in that the luminance in the transmissive display can be effectively obtained.

It is preferable that in the above-mentioned pixel, the proportion of the area of the reflective region, represented by the formula (1), is increased in order of the yellow filter, the red filter, the green filter, and the blue filter. According to this configuration, in the reflective display, the white balance in the reflective display can be more effectively optimized by forming the filters in such a way that the yellow filter having the lowest color temperature and the red filter having the second lowest color temperature each have a smaller proportion of the area of the reflective region, than that of each of the green and blue filters having a relatively high color temperature.

It is preferable that in the pixel, the red filter, the green filter, the yellow filter, and the blue filter are arranged in a stripe pattern in this order. According to this, in both of the transmissive display and the reflective display, red and green, and yellow and blue, which are pairs of complementary color, are disposed adjacent to each other. Further, green and yellow each having a high luminance are arranged at the center of the pixel. Therefore, coloring of a white line which is displayed using a mixed color on a black base can be reduced. Further, the filters are arrayed in a stripe pattern, and therefore, the filters having the same color can be simultaneously formed between adjacent two pixels, which results in simplification of the production steps.

It is preferable that the first display device is a liquid crystal display device. According to the first display device of the present invention, the color reproduction range can be extended, and further the difference in the white balance between the transmissive display and the reflective display can be reduced. Therefore, a liquid crystal display device with high display qualities can be provided. In terms of display qualities such as a contrast and a color reproduction range, the liquid crystal mode is preferably a VA mode, but not limited thereto because the effects of the present invention are similarly exhibited in other liquid crystal modes.

The present invention is a transflective display device including four or more filters having different colors in a pixel, each of the four or more filters having different colors including: a transmissive region for displaying an image by transmitting light from a backlight; and a reflective region for displaying an image by reflecting surrounding light, wherein at least two of the four or more filters having different colors are different in an area of the reflective region (herein, also referred to as "the second display device"). The first and second display devices of the present invention differ in technical means for adjusting the white balance in the reflective display. That is, in the first display device, the white balance in the reflective display is adjusted by adjusting the "proportion of the area of the reflective region in the filter". However, in the second display device, the white balance in the reflective display is adjusted by adjusting the "area of the reflective region in the filter". According to the second display device of the present invention, the effective area of the filter is not taken into consideration. Therefore, if the effective area of the filter is substantially the same among all of the filters having different colors, for example, the same operation and effects as in the first display device of the present invention can be exhibited. In the present description, the term "substantially the same" includes the state where the effective area is the same and the state where the effective area is different but it can be identified to be substantially the same.

Preferable embodiments of the second display device of the present invention are mentioned below. The details are the same as in the explanation on the first display device of the present invention, although the first and second display devices differ in the above-mentioned point. Preferable embodiments of the second display device include an embodiment (a) in which a shielding film is arranged to overlap with a part of at least one of the four or more filters having different colors, and the at least two of the four or more filters having different colors are different in an area of the shielding film; an embodiment (b) in which a shielding film is arranged instead of a part of at least one of the four or more filters having different colors, and the at least two of the four or more filters having different colors are different in an area of the shielding film; an embodiment (c) in which a reflective member is arranged in each of the four or more filters having different colors, and an area of the reflective member is different between the at least two of the four or more filters having different colors; and an embodiment (d) in which a red filter, a green filter, a blue filter, and a yellow filter are arranged in the pixel. It is preferable that the yellow filter has a smaller area of the reflective region than that of any one of the other filters. It is more preferable that the yellow filter has a smaller area of the reflective region than that of the blue filter. It is preferable that the yellow filter is arranged adjacent to the blue filter, and an area of the reflective region in the blue filter is extended toward the reflective region in the yellow filter. It is more preferable that the yellow filter has a smaller area of the reflective region than that of the green filter. It is particularly preferable that the yellow filter has the smallest area of the reflective region among all of the filters. Further, it is preferable that the yellow filter has substantially the same area of the transmissive region as that of each of the other filters. It is also preferable that the yellow filter has the largest area of the transmissive region among all of the filters. It is preferable that the blue filter has the largest area of the reflective region among all of the filters. It is preferable that the red filter has a smaller area of the reflective region than that of each of the green and blue filters. It is preferable that the red filter has substantially the same area of the transmissive region as that of the green filter. It is preferable that the red filter has a larger area of the transmissive region than that of the green filter. It is preferable that in the above-mentioned pixel, the area of the reflective region is increased in order of the yellow filter, the red filter, the green filter, and the blue filter. It is preferable that the red filter, the green filter, the yellow filter, and the blue filter are arranged in a stripe pattern in this order. It is preferable that the second display device is a liquid crystal display device.

It is preferable that the first and second display devices of the present invention are appropriately combined. As such an embodiment in which the first and second display devices are combined, an embodiment in which the yellow filter has a smaller proportion of the area of the reflective region represented by the above formula (1) and a smaller area of the reflective region, than those in the blue filter. According to this embodiment, white in the reflective display can be effectively suppressed from having a yellow tinge. As a result, the white balance in the reflective display can be effectively optimized. The combination of the first display device with the second display device is not especially limited.

The present invention is further a transflective display device including three or more filters having different colors in a pixel, each of the three or more filters having different colors including: a transmissive region for displaying an image by transmitting light from a backlight; and a reflective region for displaying an image by reflecting surrounding light, wherein a red filter, a green filter, and a blue filter are arranged in the pixel, the blue filter has a larger proportion of an area of the reflective region than that of any one of the three or more filters having different colors, and the proportion of the area is represented by the above formula (1) (hereinafter, also referred to as "the third display device"). Generally, surrounding light used as a light source for the reflective display has a lower color temperature than that of a backlight used as a light source for the transmissive display. Therefore, the proportion of the area of the reflective region in the blue filter having a high color temperature is increased, thereby increasing a color temperature of white in the reflective display. As a result, the difference in the white balance between the transmissive display and the reflective display can be reduced.

Preferable embodiments of the above-mentioned third display device include: an embodiment (D) in which only filters having three primary colors, i.e., a red filter, a green filter, and a blue filter are arranged; and an embodiment (E) in which four filters, i.e., a red filter, a green filter, a blue filter, and a yellow filter, are arranged. Among these, according to the embodiment (E), the yellow filter is added to the filters having three primary colors of red, green, and blue, and thereby in both of the transmissive and reflective displays, the color reproduction range can be extended, and further the proportion of the area of the reflective region in the blue filter which is a complementary color of yellow is increased, thereby suppressing white in the reflective display from having a yellow tinge. As a result, the difference in the white balance between the transmissive display and the reflective display can be effectively reduced.

The present invention is a transflective display device including three or more filters having different colors in a pixel, each of the three or more filters having different colors including: a transmissive region for displaying an image by transmitting light from a backlight; and a reflective region for displaying an image by reflecting surrounding light, wherein a red filter, a green filter, and a blue filter are arranged in the pixel, the red filter has a smaller proportion of an area of the reflective region than that of any one of the three or more filters having different colors, and the proportion of the area is represented by the above formula (1) (hereinafter, also referred to as "the fourth display device"). Generally, surrounding light used as a light source for the reflective display has a lower color temperature than that of a backlight used as a light source for the transmissive display. Therefore, the proportion of the area in the reflective region of the red filter having a low color temperature is decreased, thereby increasing the color temperature of white in the reflective display. As a result, the difference in the white balance between the transmissive display and the reflective display can be reduced.

Preferable embodiments of the fourth display device include: an embodiment (F) in which only a red filter, a green filter, and a blue filter are arranged; and an embodiment (G) in which a red filter, a green filter, a blue filter, and a yellow filter are arranged. Among these, according to the embodiment (G), the yellow filter is added to the filter shaving three primary colors of red, green, and blue, and thereby in both of the transmissive and reflective displays, the color reproduction range can be extended, and further the proportion of the area of the reflective region in the red filter having a low color temperature is reduced, thereby suppressing white in the reflective display from having a yellow tinge. As a result, the difference in white balance between the transmissive display and the reflective display can be effectively reduced.

The present invention is a reflective display device including four or more filters having different colors in a pixel, wherein at least two of the four or more filters having different colors are different in an effective area (hereinafter, also referred to as "the fifth display device"). Generally, surrounding light used as a light source for the reflective display has a color temperature lower than a color temperature of a backlight used as a light, source for the transmissive display. Accordingly, if the effective area is different between at least two of the four or more filters having different colors, the white balance in the reflective display can be adjusted, thereby being optimized. The effective area of the filter, herein used, means an area of a region which can be used for the reflective display in the region where the filter is arranged.

Preferable embodiments of the fifth display device of the present invention are mentioned below. The details are the same as the explanation on the first display device of the present invention.

It is preferable in the fifth display device that a shielding film is arranged to overlap with a part of at least one of the four or more filters having different colors, and the at least two of the four or more filters having different colors are different in an area of the shielding film. It is preferable in the fifth display device that a shielding film is arranged instead of a part of at least one of the four or more filters having different colors, and the at least two of the four or more filters having different colors are different in an area of the shielding film. It is preferable in the fifth display device that a reflective member is arranged in each of the four or more filters having different colors, and an area of the reflective member is different between the at least two of the four or more filters having different colors. These are preferable as a method of adjusting the white balance in the reflective display.

It is preferable in the fifth display device that a red filter, a green filter, a blue filter, and a yellow filter are arranged in the pixel. It is preferable that the yellow filter has a smaller effective area than that of any one of the other filters. It is preferable that the yellow filter has a smaller effective area than that of the blue filter. It is preferable that the yellow filter is arranged adjacent to the blue filter, and an area of the reflective region in the blue filter is extended toward the reflective region in the yellow filter. It is preferable that the yellow filter has a smaller effective area than that of the green filter. It is preferable that the yellow filter has the smallest effective area among all of the filters. It is preferable that the blue filter has the largest effective area among all of the filters. It is preferable that the red filter has a smaller effective area than that of each of the green and blue filters. It is preferable that the effective area is increased in order of the yellow filter, the red filter, the green filter, and the blue filter. It is preferable that the red filter, the green filter, the yellow filter, and the blue filter are arranged in a stripe pattern in this order. It is preferable that the fifth display device is a liquid crystal display device.

The present invention is further a color filter substrate used in the first to fifth display devices of the present invention.

That is, the following color filters ($\alpha$) to ($\epsilon$) may be mentioned.

($\alpha$) A color filter substrate including four or more filters having different colors in each color filter, each of the four or more filters having different colors including: a transmissive region for displaying an image by transmitting light from a backlight; and a reflective region for displaying an image by reflecting surrounding light, wherein at least two of the four or more filters having different colors are different in a proportion of an area of the reflective region, represented by the above formula (1).

($\beta$) A color filter substrate including four or more filters having different colors in each color filter, each of the four or more filters having different colors including: a transmissive region for displaying an image by transmitting light from a backlight; and a reflective region for displaying an image by reflecting surrounding light, wherein at least two of the four or more filters having different colors are different in an area of the reflective region.

($\gamma$) A color filter substrate including three or more filters having different colors in each color filter, each of the three or more filters having different colors including: a transmissive region for displaying an image by transmitting light from a backlight; and a reflective region for displaying an image by reflecting surrounding light, wherein at least a red filter, a green filter, and a blue filter are arranged, and the blue filter has a larger proportion of the area of the reflective region, represented by the above formula (1), than that of any one of the three or more filters having different colors.

($\delta$) A color filter substrate including three or more filters having different colors in each color filter, each of the three or more filters having different colors including: a transmissive region for displaying an image by transmitting light from a backlight; and a reflective region for displaying an image by reflecting surrounding light, wherein at least a red filter, a green filter, and a blue filter are arranged, and the red filter has a smaller proportion of the area of the reflective region, represented by the above formula (1), than that of any one of the three or more filters having different colors.

($\epsilon$) A color filter substrate including four or more filters having different colors in each color filter, wherein at least two of the four or more filters having different colors are different in an effective area.

If each of the color filters ($\alpha$) to ($\delta$) is used in a transflective display device, the white balance in the reflective display can be adjusted and the difference in the white balance between the transmissive display and the reflective display can be reduced. If the color substrate ($\epsilon$) is used in a reflective display device, the reflective display device is used, and therefore the white balance in the reflective display can be adjusted, thereby being optimized.

Effect of the Invention

According to the display device of the present invention, the four or more filters having different colors are arranged in the pixel, and the color reproduction range can be extended and at least two of the four or more filters having different colors are different in the proportion of the area of the reflective region. Therefore, the proportion of the area of the reflective region is properly adjusted, and thereby the difference in the white balance between the transmissive display and the reflective display can be reduced.

BEST MODES FOR CARRYING OUT THE INVENTION

The present invention is mentioned in more detail below with reference to Embodiments, but not limited to only these Embodiments. Configurations and measured values and the like in the following Embodiments are based on simulations which were performed using a computer program.

The display devices in accordance with Embodiments of the present invention are transflective liquid crystal display devices. That is, according to the transflective liquid crystal display devices, transmissive display using light from the backlight is mainly observed under relatively dark environments such as indoor environment. Under relatively bright environments such as outdoor environment, reflective display using surrounding light is mainly observed.

(1) Configuration of Liquid Crystal Display Device (1-1) Embodiment 1

FIG. 6 is a planar view schematically showing a configuration of a TFT substrate 12 in a transflective display device in accordance with Embodiment 1 of the present invention.

As the TFT substrate 12 in the present Embodiment, as shown in FIG. 6, a matrix wiring consisting of a gate bus line 5 and a source bus line 6 is arranged on a glass substrate 31. A transmissive electrode 35 and a reflective electrode 34 are arranged in the region surrounded by the matrix wiring. These electrodes face the respective filters having different colors which are arranged in a below-mentioned color filter substrate 11. Further, these electrodes are connected to a drain electrode of a thin film transistor (TFT, not shown) arranged below the reflective electrode 34. In the region below the reflective electrode 34, a storage capacitance (Cs) wiring 7 is arranged in parallel to the gate bus line 5 to maintain a voltage applied to the transmissive electrode 35 and the reflective electrode 34.

FIG. 7 is a planar view schematically showing a configuration of a color filter substrate (counter substrate) 11 in the transflective display device in accordance with Embodiment 1 of the present invention.

As shown in FIG. 7, according to the counter substrate 11 in accordance with the present Embodiment, a red filter 10R, a green filter 10G, a yellow filter 10Y, and a blue filter 10B are arrayed in a stripe pattern in this order. Between two of these filters, a black matrix 10BM is arranged. According to the present embodiment, the pixel has the same array of the filters 10R, 10B, 10G and 10Y. In the pixel, each filter has a reflective region a and a transmissive region b. The reflective region a is a region which faces the reflective electrode 34 in the TFT substrate 12 and which is used for reflective display. The transmissive region b is a region which faces the transmissive electrode 35 in the TFT substrate and which is used for transmissive display.

FIG. 9 is a planar view schematically showing a configuration of pixels of the following liquid crystal display device: in all of the filters having different colors, a proportion of an area of the reflective region is uniformly 0.33 and a proportion of an area of the transmissive region is uniformly 0.67, when an area of each sub-pixel (effective area of the filter) is defined as 1. Hereinafter, in this pixel, the proportion of the area of the reflective region in the filter is referred to as a "standard reflective area proportion" and the proportion of the area of the transmissive region is referred to as a "standard transmissive area ratio".

According to the pixels in the present Embodiment, the region which is shielded by the black matrix 10BM is extended, thereby decreasing the proportion of the area of the reflective region Y in the yellow filter 10Y by 0.23 relative to the standard reflective area proportion, as shown in the following Table 1.

TABLE 1

| | Proportion of area of reflective region | | | | Proportion of area of transmissive region | | | |
| --- | --- | --- | --- | --- | --- | --- | --- | --- |
| | Ra | Ga | Ya | Ba | Rb | Gb | Yb | Bb |
| Embodiment 1 | 0.33 | 0.33 | 0.10 | 0.33 | 0.67 | 0.67 | 0.67 | 0.67 |
| Embodiment 2 | 0.33 | 0.33 | 0.10 | 0.33 | 0.67 | 0.67 | 0.90 | 0.67 |
| Embodiment 3 | 0.33 | 0.33 | 0.23 | 0.43 | 0.67 | 0.67 | 0.67 | 0.57 |
| Embodiment 4 | 0.33 | 0.33 | 0.23 | 0.43 | 0.67 | 0.67 | 0.77 | 0.57 |
| Embodiment 5 | 0.30 | 0.33 | 0.23 | 0.43 | 0.67 | 0.67 | 0.67 | 0.57 |
| Embodiment 6 | 0.30 | 0.33 | 0.23 | 0.43 | 0.70 | 0.67 | 0.77 | 0.57 |
| Comparative Embodiment 1 | 0.33 | 0.33 | 0.33 | 0.33 | 0.67 | 0.67 | 0.67 | 0.67 |
| Reference Embodiment 1 | 0.33 | 0.33 | 0.00 | 0.33 | 0.67 | 0.67 | 0.67 | 0.67 |
| Reference Embodiment 2 | 0.33 | 0.33 | 0.00 | 0.33 | 0.67 | 0.67 | 1.00 | 0.67 |

FIG. 8 is a schematic view showing a cross-section taken along line P-Q in FIGS. 6 and 7. The configuration of the cross-section of the display device in accordance with the present Embodiment is mentioned below.

The display device in accordance with the present Embodiment has a configuration in which a liquid crystal layer 13 is arranged between a counter substrate 11 and a TFT substrate 12, as shown in FIG. 8.

The counter substrate 11 includes a retarder 22 and a polarizer 23 on the outer side (observation surface side) of a glass substrate 21, and further includes the red filter 10R, the green filter LOG, the blue filter 10B, the yellow filter 10Y, the black matrix 10BM, an overcoat layer 25, a counter electrode 26, and an alignment film 27 on the inner side (back surface side) of the glass substrate 21.

The retarder 22 adjusts polarization state of light which passes therethrough. The polarizer 23 transmits only light having a specific polarization component. According to the present Embodiment, the retarder 22 and the polarizer 23 are set to function as a circular polarizer by adjusting the arrangement and configuration thereof.

The red filter 10R, the green filter 10G, the blue filter 10B, and the yellow filter 10Y each select a color of light which passes therethrough. Spectral characteristics of the reflective filters used in the present Embodiment are shown in FIG. 10. As shown in FIG. 10, with regard to the three primary color filters, the red filter 10R mainly transmits a red component of incident light; the green filter 10G mainly transmits a green component of incident light; and the blue filter 10B mainly transmits a blue component. The yellow filter 10Y mainly transmits both color components of the red component and the green component of incident light. According to the present Embodiment, the size and thickness of the filter are almost the same between the reflective region a and the transmissive region b. However, they may not be necessarily the same. The luminance of light which passes through each color filter is changed if the size or thickness of the filter is changed. Therefore, it is preferable that the respective filters having different colors are designed in such a way that the white balance is maintained.

The overcoat layer 25 prevents contaminants from entering the liquid crystal layer 13 from the red filter 10R, the green filter 10G, and the blue filter 10B, and the yellow filter 10Y. The overcoat layer 25 flattens the surface of the counter substrate 11. The counter electrode 26 faces the reflective electrode 34 and the transmissive electrode 35 arranged on the TFT substrate 12 side with the liquid crystal layer 13 therebetween. The counter electrode 26 is used to drive liquid crystal molecules by applying a voltage to the liquid crystal layer 13. The alignment film 27 controls alignment of liquid crystal molecules in the liquid crystal layer 13.

The TFT substrate 12 includes a retarder 32 and a polarizer 33 on the outer side (back surface side) of the glass substrate 31 and further includes a projection (multi-gap layer) 37, the reflective electrode 34 which also serves as a reflective member, the transmissive electrode 35 and an alignment film 38 on the inner side (observation surface side) of the glass substrate 31. The projection 37 and the reflective electrode 34 are formed in the reflective region a. The transmissive electrode 35 is formed in the transmissive region b.

The retarder 32 adjusts polarization state of light which passes therethrough, similarly to the retarder 22. The polarizer 33 transmits only light having a specific polarization component, similarly to the polarizer 23. According to the present Embodiment, the retarder 22 and the polarizer 23 are set to function as a circular polarizer by adjusting the arrangement and configuration thereof. This circular polarizer is arranged to be optically perpendicular to the circular polarizer arranged on the counter substrate 11 side.

The projection 37 is arranged in each reflective region a of the red filter 10R, the green filter 10G, the blue filter 10B, and the yellow filter 10Y. According to the present Embodiment, the projection 37 is formed on the TFT substrate 12 side, and thereby the cell thickness in the reflective region a becomes smaller than the cell thickness in the transmissive region b.

The reflective electrode 34 is an electrode which has a light reflective function (in simulations, the electrode is assumed to have a reflectance of 100%) and it is formed on the projection 37. This reflective electrode 34 reflects surrounding light and drives liquid crystal molecules by applying a voltage to the liquid crystal layer 13. The reflective electrode 34 is used for reflective display. The reflective electrode 34 is formed of a metal of aluminum (Al) and the like.

According to the present Embodiment, the reflective electrode 34 serves as both of the material for reflecting surrounding light and the electrode for driving the liquid crystal molecules. Alternatively, the display device may have a configuration in which a reflective member which has no function as an electrode and an electrode is separately formed in a region corresponding to the region where the reflective member is arranged. In this case, the reflective member may be arranged on the back surface side of the glass substrate 31. Further, the transmissive electrode 35 is an electrode formed of a transparent conductive material such as indium tin oxide (ITO) The reflective electrode 34 and the transmissive electrode 35 are formed in every filter on the counter substrate 11 side and apply a voltage to the liquid crystal layer 13 in every filter region, thereby driving liquid crystal molecules. The alignment film 38 controls alignment of the liquid crystal molecules in the liquid crystal layer 13, similarly to the alignment film 27.

FIG. 11 is a graph showing measurement results of a spectral transmittance and a spectral reflectance of the liquid crystal layer 13. The spectral reflectance is a ratio at each wavelength of an amount of light which enters the display device from the outside to an amount of light which is reflected by the reflective region a and emitted as reflective display light to the outside. The spectral transmittance is a ratio at each wavelength of an amount of light from a backlight 36 to an amount of light which passes through the transmissive region b and emitted as the transmissive display light to the outside.

On the hack face (back surface) side of the TFT substrate 12, the backlight 36 for transmissive display is arranged. Optical characteristics and the like of the light source used as the backlight 36 are mentioned in the following (2).

(1-2) Embodiment 2

FIG. 12 is a planar view schematically showing a configuration of one pixel in a liquid crystal display device in accordance with Embodiment 2 of the present invention.

According to the pixels in the present Embodiment, as shown in FIG. 12 and the above-mentioned Table 1, the transmissive region Yb in the yellow filter 10Y is extended, thereby decreasing the proportion of the area of the reflective region Ya in the yellow filter 10Y by 0.23 relative to the standard area proportion, similarly in Embodiment 1. The proportion of the area of the transmissive region Yb in the yellow filter 10Y is set to be larger than the standard transmissive area proportion by 0.23.

(1-3) Embodiment 3

FIG. 13 is a planar view schematically showing a configuration of one pixel in the liquid crystal display device in accordance with Embodiment 3 of the present invention.

According to the pixels in the present Embodiment, as shown in FIG. 13 and the above-mentioned Table 1, the region which is shielded by the black matrix 10BM is extended, thereby decreasing the proportion of the area of the reflective region Ya in the yellow filter 10Y by 0.10 relative to the standard area proportion. Further, the transmissive region Bb in the blue filter 10B is decreased, thereby increasing the proportion of the area of the reflective region Ba in the blue filter by 0.10 relative to the standard area proportion.

(1-4) Embodiment 4

FIG. 14 is a planar view schematically showing a configuration of one pixel in the liquid crystal display device in accordance with Embodiment 4 of the present invention.

According to the pixels in the present Embodiment, as shown in FIG. 14 and the above-mentioned Table 1, the transmissive region Yb in the yellow filter 10Y is extended, thereby decreasing the proportion of the area of the reflective region Ya in the yellow filter 10Y by 0.10 relative to the standard area proportion, similarly in Embodiment 3. Further, the transmissive region Bb in the blue filter 10B is decreased, thereby increasing the proportion of the area of the reflective region Ba in the blue filter by 0.10 relative to the standard area proportion.

(1-5) Embodiment 5

FIG. 15 is a planar view schematically showing a configuration of one pixel in the liquid crystal display device in accordance with Embodiment 5 of the present invention.

According to the pixels in the present Embodiment, as shown in FIG. 15 and the above-mentioned Table 1, the pixels in accordance with Embodiment 3 are improved in that the region which is shielded by the black matrix 10BM is extended in the pixels according to Embodiment 3, thereby decreasing the proportion of the area of the reflective region Ra in the red filter 10R by 0.03 relative to the standard area proportion.

(1-6) Embodiment 6

FIG. 16 is a planar view schematically showing a configuration of one pixel in the liquid crystal display device in accordance with Embodiment 6 of the present invention.

According to the pixels in the present Embodiment, as shown in FIG. 16 and the above-mentioned Table 1, the pixels in accordance with Embodiment 4 are improved in that the transmissive region Rb in the red filter 10R is extended, thereby decreasing the proportion of the area of the reflective region Ra in the red filter 10R by 0.03 relative to the standard area proportion.

(1-7) Comparative Embodiment 1

FIG. 9 is a planar view schematically showing a configuration of pixels in a conventional liquid crystal display device in Comparative Embodiment 1.

According to the pixels in the present Comparative Embodiment, as mentioned above, the proportion of the area of the reflective region is set to the standard reflective area proportion and the proportion of the area of the transmissive region is set to the standard transmissive area proportion in each of the filters having different colors.

(1-8) Reference Embodiment 1

FIG. 17 is a planar view schematically showing a configuration of one pixel in the liquid crystal display device in accordance with Reference Embodiment 1 of the present invention.

According to the pixels in the present Reference Embodiment, as shown in FIG. 17 and the above-mentioned Table 1, the region which is shielded by the black matrix 10BM is extended, thereby eliminating the reflective region Ya in the yellow filter 10Y. That is, the liquid crystal display device according to the present Reference Embodiment is configured to perform reflective display using the filters having three primary colors, i.e., the red filter 10R, the green filter 10G, and the blue filter 10G.

(1-9) Reference Embodiment 2

FIG. 18 is a planar view schematically showing a configuration of one pixel in the liquid crystal display device in accordance with Reference Embodiment 2 of the present invention.

According to the pixels in the present Reference Embodiment, as shown in FIG. 18 and the above-mentioned Table 1, the transmissive region Yb in the yellow filter 10B is extended, thereby eliminating the reflective region Ya in the yellow filter 10Y. That is, the liquid crystal display device according to the present Reference Embodiment is also configured to perform reflective display using the filters having three primary colors, i.e., the red filter 10R, the green filter 10G, and the blue filter 10G.

(2) Display Quality Test of Transmissive Display and Reflective Display (2-1.) Calculation Method of Color Temperature The liquid crystal display devices according to Embodiments 1 to 6, Comparative Embodiment 1, and Reference Embodiments 1 and 2 were subjected to a white balance evaluation test. The white balance is generally expressed as a color temperature (color temperature of white display). Accordingly, in this evaluation test, the following calculation method is employed. Chromaticity coordinates (x, y) in the XYZ color system (CIE 1931 standard colorimetric system) when the liquid crystal display device displays white are measured. Then, using the measured chromaticity coordinates, the color temperature (relative color temperature) $T_c$ is calculated from the following formula (6) (MaCcamy, C. S., Correlated color temperature as an explicit function of chromaticity coordinates, ColorRes.) Appl. 17, 142 to 144 (1992)).

$$T_c = -437n^3 + 3601n^2 - 6861n + 5514.31 \qquad (6)$$

where n is expressed as n=(x−0.3320)/(y−0.1858)

(2-2) Measurement Method of White Balance in Transmissive Display

The liquid crystal display devices according to Embodiments 1 to 6, Comparative Embodiment 1, and Reference Embodiments 1 and 2 perform transmissive display using the red filter 10R, the green filter 10G, the blue filter 10B, and the yellow filter 10Y. If a light source corresponding to spectral characteristics of the filters 10R, 10G, and 10B which are filters having three primary colors of red, green, and blue are used, the white balance is shifted to yellow and the color temperature is lowered. Therefore, in order to optimize the white balance in the transmissive display, light sources α to γ in FIG. 19 were used as the light source in the backlight 36 and thereby the color temperature when white was displayed in the transmissive display was measured.

Each of the light sources α to γ emits bluish light having a higher color temperature in comparison to light emitted from a light source used in the configuration in which filters having three primary colors of red, green, and blue are used for the transmissive display. As shown in FIG. 19, light emission spectrums of the light sources α to γ are different from each other, but this shows that the blue tinge is different among the light sources α to γ. More specifically, the light source γ emits light with the weakest blue (the light source γ has the lowest color temperature) and the light source a emits light with the strongest blue (the light source ahas the highest color temperature).

(2-3) Measurement Method of White Balance in Reflective Display

The liquid crystal display device uses surrounding light as the light source when it performs reflective display. In this evaluation test, chromaticity coordinates (x, y) when white was displayed were measured using a light source almost equal to the light source $D_{65}$ as the light source for the reflective display. The spectrum of the light source $D_{65}$ is shown in FIG. 20.

(2-4) Evaluation of Difference in White Balance Between Transmissive Display and Reflective Display Excellent display qualities in both of the transmissive display and the reflective display can be maintained if the color temperature of white in the reflective display is from 5000 to 12000K and a difference in color temperature of white between the reflective display and the transmissive display is 2000 K or less, generally. According to the above-mentioned methods (2-1) to (2-3), color temperatures when white is displayed in the transmissive display and the reflective display were measured. Based on these results, the difference in color temperature between the modes (hereinafter, also referred to as a "difference between the modes") was calculated. Table 2 shows the results.

tained with in a proper range. Therefore, the luminance in the reflective display could be further improved.

In addition, according to Embodiments 5 and 6, the proportion of the area of the reflective region Ra in the red filter 10R having a low color temperature was decreased, thereby further improving the white balance in the reflective display.

TABLE 2

| | Reflective display | | | Transmissive display | | | | Difference |
|---|---|---|---|---|---|---|---|---|
| | Light source | Luminance | Color temperature (K) | NTSC ratio | Light source | Luminance | Color temperature (K) | NTSC ratio | between modes (K) |
| Embodiment 1 | D65 | 0.61 | 6244 | 49% | γ | 1.00 | 6767 | 72% | 523 |
| Embodiment 2 | D65 | 0.61 | 6244 | 49% | α | 1.24 | 7065 | 71% | 821 |
| Embodiment 3 | D65 | 0.75 | 6150 | 44% | β | 1.00 | 5988 | 71% | 162 |
| Embodiment 4 | D65 | 0.75 | 6150 | 44% | α | 1.09 | 6418 | 71% | 268 |
| Embodiment 5 | D65 | 0.75 | 6724 | 44% | β | 1.00 | 5988 | 71% | 736 |
| Embodiment 6 | D65 | 0.75 | 6724 | 44% | α | 1.09 | 6237 | 71% | 487 |
| Comparative Embodiment 1 | D65 | 1.00 | 3925 | 40% | γ | 1.00 | 6767 | 72% | 2842 |
| Reference Embodiment 1 | D65 | 0.60 | 7042 | 35% | γ | 1.00 | 6767 | 72% | 275 |
| Reference Embodiment 2 | D65 | 0.60 | 7042 | 35% | α | 1.37 | 6049 | 71% | 993 |

In Comparative Embodiment 1, as shown in FIG. 9 and the above-mentioned Table 1, the proportion of the area of the reflective region Ya in the yellow filter is the same as those of other filters having three primary colors. Therefore, the color temperature of white in the reflective display was smaller than 4000 K, and the white balance was shifted to the yellow side. Further, the difference between the modes was larger than 2000 K, and therefore a large difference in display qualities was generated between the transmissive display and the reflective display.

However, in Embodiments 1 to 6, the region which was shielded by the black matrix 10BM or the transmissive region Yb of the yellow filter 10Y was extended, thereby making the proportion of the area of the reflective region Ya in the yellow filter ICY smaller than those of the other filters having three primary colors. Therefore, the white balance in the reflective display could be suppressed from shifting to the yellow side and the color temperature of white in the reflective display could be maintained to 5000 K or more. According to these Embodiments, the reflective region Ya in the yellow filter 10Y was adjusted unless the white balance was shifted, and thereby the luminance in the reflective display or the color reproduction range could be improved in comparison to Reference Embodiments 1 and 2 where the reflective region Ya in the yellow filter was not used.

According to Embodiments 2, 4, and 6, the proportion of the area of the reflective region Ya in the yellow filter ICY was decreased, and thereby the proportion of the area of the transmissive region Yb in the yellow filter 10Y could be increased. Therefore, the luminance in the transmissive display could be improved, and further the white balance in the transmissive display could be suppressed from shifting to the yellow side using the light source a which emitted light with the strongest blue.

According to Embodiments 3 to 6, the reflective region Ba in the blue filter 10B which is a complementary color of yellow was extended and thereby the proportion of the area of the reflective region Ya in the yellow filter 10Y could be increased to be larger than those in Embodiments 1 and 2 while the white balance in the reflective display was main- (3) Modified Embodiment of Embodiment 1

Embodiments shown in FIGS. 21(*a*) to 21(*e*) and 22(*a*) to 22(*d*) may be mentioned as modified embodiments of the pixel configuration in Embodiment 1. Also in these embodiments, the same operation and effects as in Embodiment 1 can be exhibited.

(4) Modified Embodiment of Embodiment 2

An embodiment shown in FIG. 23 may be mentioned as a modified embodiment of the pixel configuration in Embodiment 2. In this embodiment, the yellow filter 10Y is arranged adjacent to the blue filter 10B and the area of the reflective region Ba in the blue filter 10B is extended toward the reflective region Ya in the yellow filter 10Y. According to this embodiment, there is no need to decrease the transmissive region Bb in the blue filter 10B in order to increase the reflective region Ba in the blue filter 10B. Therefore, further adjustment of the spectrum of the backlight (enhance of blue) is not needed for maintaining the white balance in the transmissive display, and therefore the reduction in luminance in the transmissive display can be suppressed.

(5) Modified Embodiment of Embodiments

According to the display devices in the present Embodiments of the present invention, the transmissive display using light from a backlight is dominant under dark environment and the reflective display using surrounding light is dominant under bright environment. However, the configuration of the display device is not limited to such a configuration, and the display device may be configured to select either of the transmissive or reflective display depending on surrounding light intensity and switch a method of driving liquid crystals in accordance with the selected display mode.

The liquid crystal display devices according to the present Embodiments are transflective liquid crystal display devices, but such devices may be configured as a display device in another system. That is, the present display device can be applied to display devices in any systems as long as it is a display device in which display is performed using a color filter having multi-colors in both of the reflection display and the transmission display. The configuration of the present display device can be applied, for example, to an organic EL display called a self-emitting display, which performs display as a hybrid with a liquid crystal display device using different filters between the transmissive region and the reflective region.

In the present description, the terms "or more" and "or less" mean that the value described (boundary value) is included.

The present application claims priority under the Paris Convention and the domestic law in the country to be entered into national phase on Patent Application No. 2006-077732 filed in Japan on Mar. 20, 2006, the entire contents of which are hereby incorporated by reference.

BRIEF DESCRIPTION OF DRAWINGS

FIG. 1(a) is a planar view schematically showing a calculation method of the effective area ($EF_{AR}$) of the filter 5a. The region surrounded by the thick line in FIG. 1(a) is an effective region in the filter 5a. FIG. 1(b) is a schematic view showing a cross-section taken along line A-B in FIG. 1(a).

FIG. 2(a) is a planar view schematically showing a calculation method of the effective area ($EF_{AR}$) of the filter 5a. In FIG. 2(a), the region surrounded by the thick line is an effective region in the filter 5a and the shaded part shows a region where the effective region in the filter 5a overlaps with the black matrix 10BM. FIG. 2(b) is a schematic view showing a cross-section taken along line A-B in FIG. 2(a).

FIG. 3(a) is a planar view schematically showing a calculation method of the effective area ($EF_{AR}$) of the filter 5a. In FIG. 3(a), the region surrounded by the thick line is an effective region in the filter 5a and the shaded part shows a region where the effective region in the filter 5a overlaps with the black matrix 10 BM. FIG. 3(b) is a schematic view showing a cross-section taken along line A-B in FIG. 3(a)

FIG. 4(a) is a planar view schematically showing a calculation method of the effective area ($EF_{AR}$) of the filter 5a. In FIG. 4(a), the region surrounded by the thick line is an effective region in the filter 5a and the shaded part shows a region where the effective region in the filter 5a overlaps with the black matrix 10 BM. FIG. 4(b) is a schematic view showing a cross-section taken along line A-B in FIG. 4(a)

FIG. 5(a) is a planar view schematically showing a calculation method of the effective area ($EF_{AR}$) of the filter 5a. In FIG. 5(a), the region surrounded by the thick solid line and dashed-dotted line is an effective region in the filter 5a of one pixel and the shaded part shows a region where the effective region in the filter 5a of one pixel overlaps with the filters 5b and 5c. FIG. 5(b) is a schematic view showing a cross-section taken along line A-B in FIG. 5(a).

EXPLANATION OF NUMERALS AND SYMBOLS

Figure 1:
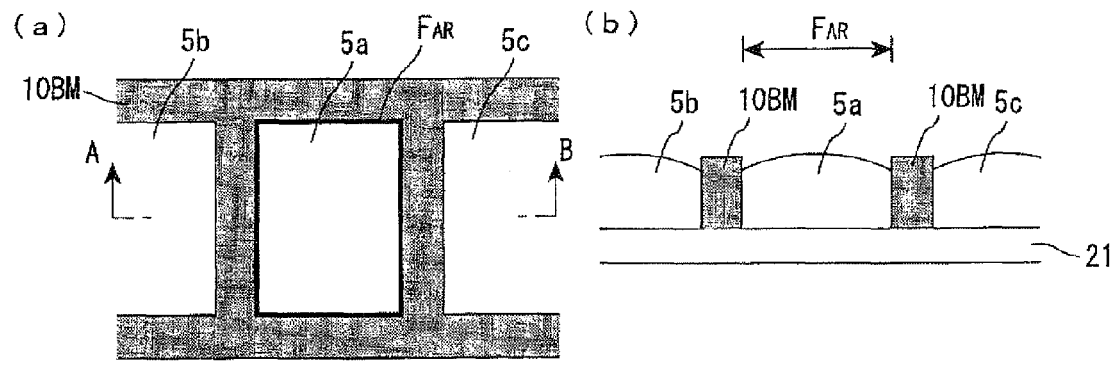
Figure 2:
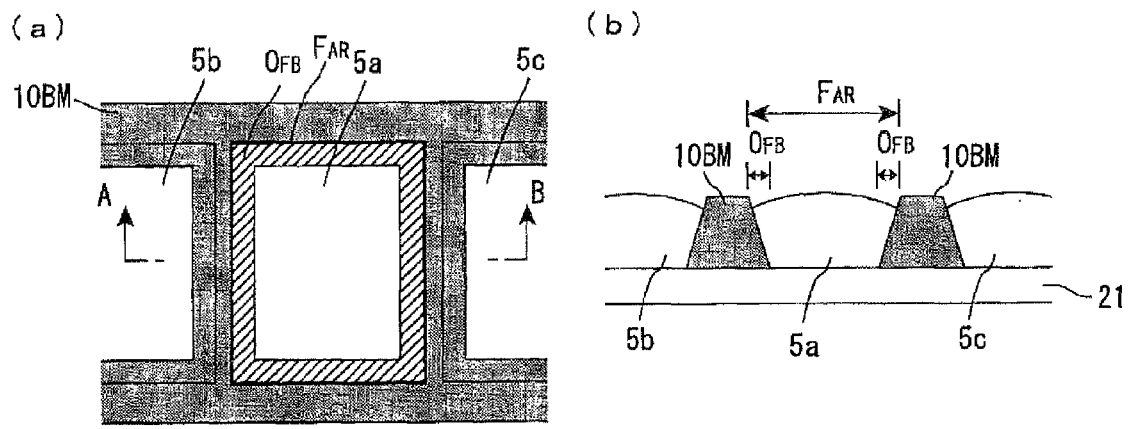
Figure 3:
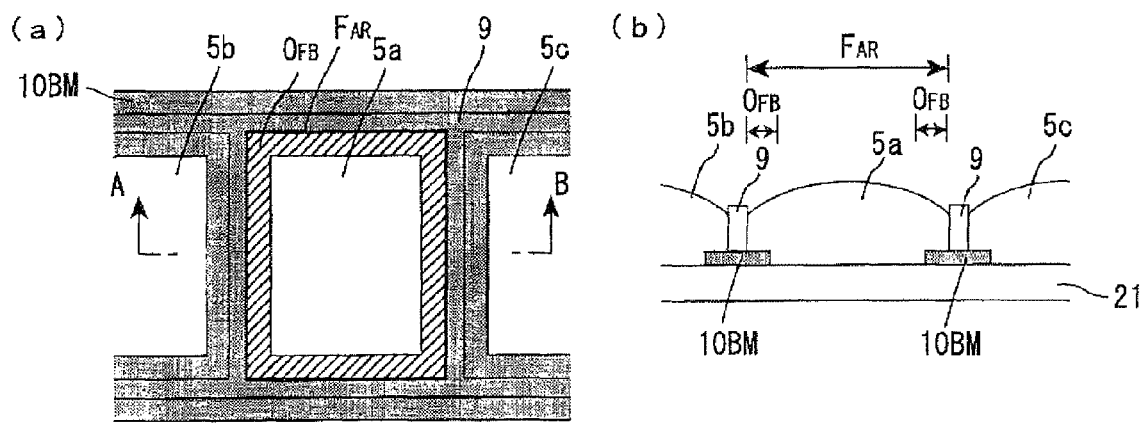
Figure 4:
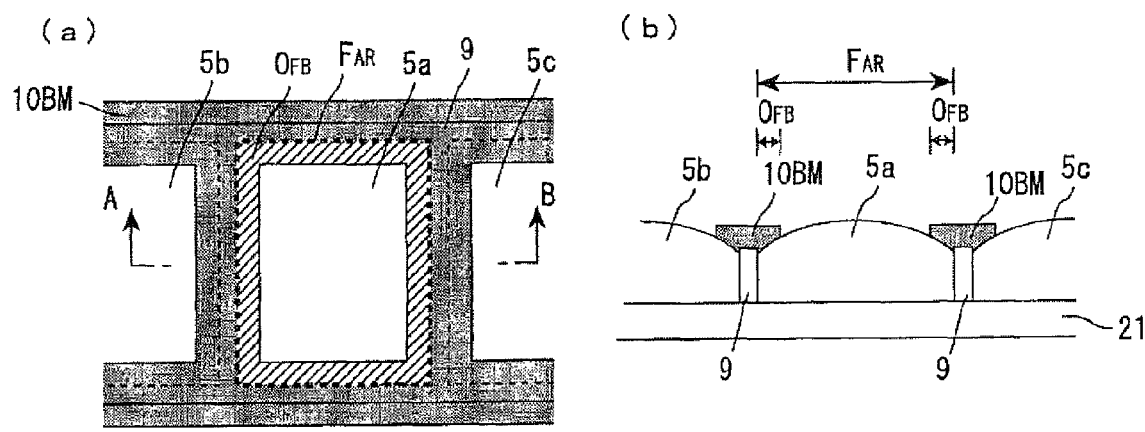
Figure 5:
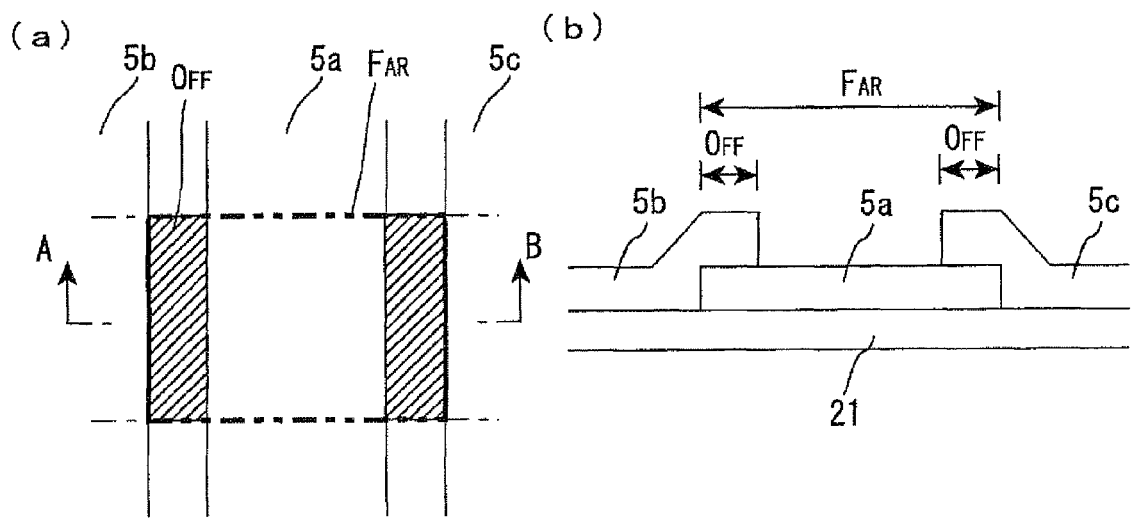
Figure 6:
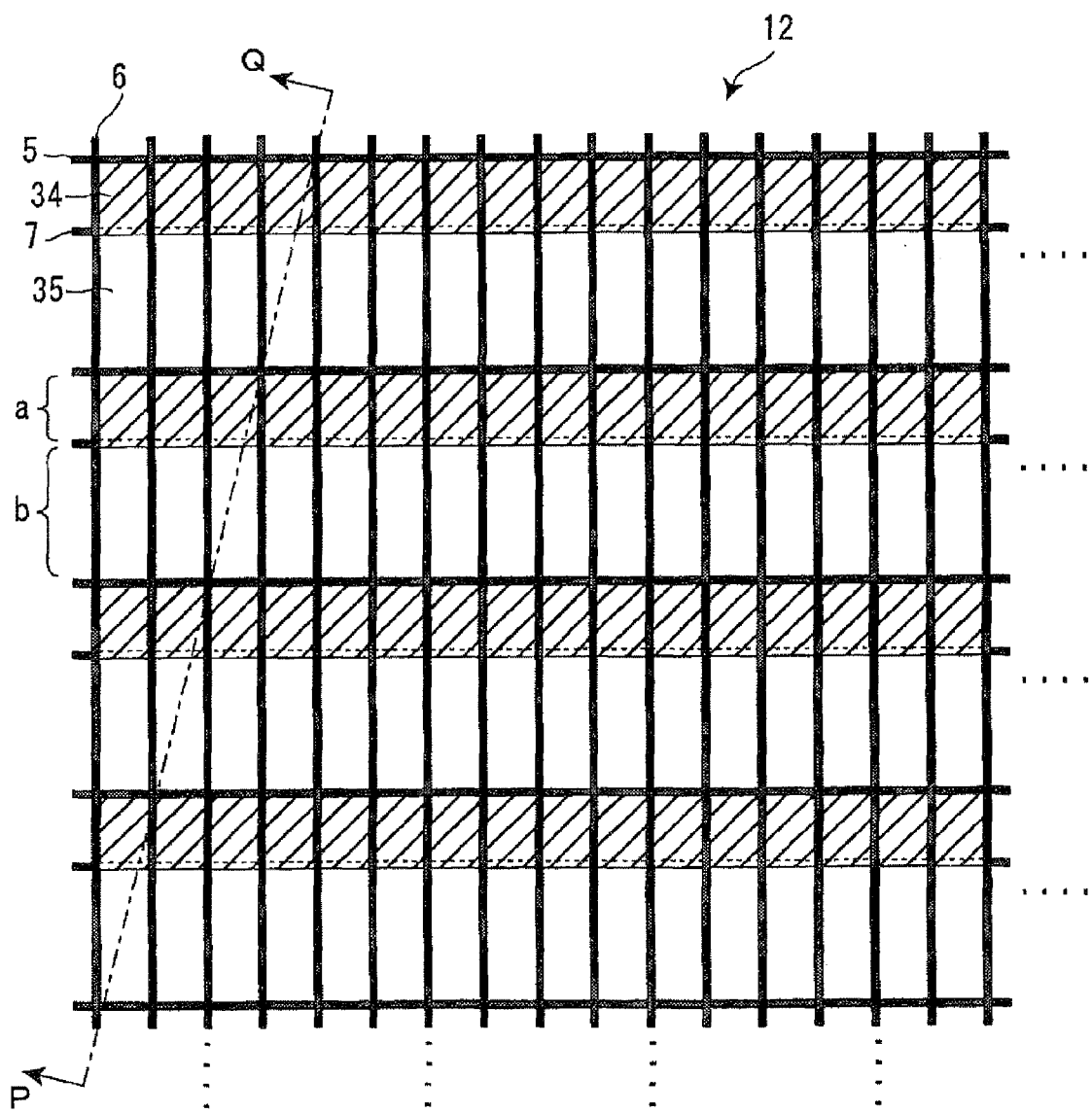
FIG. 6 is a planar view schematically showing a configuration of the TFT substrate in the transflective display device in accordance with Embodiment 1 of the present invention.
Figure 7:
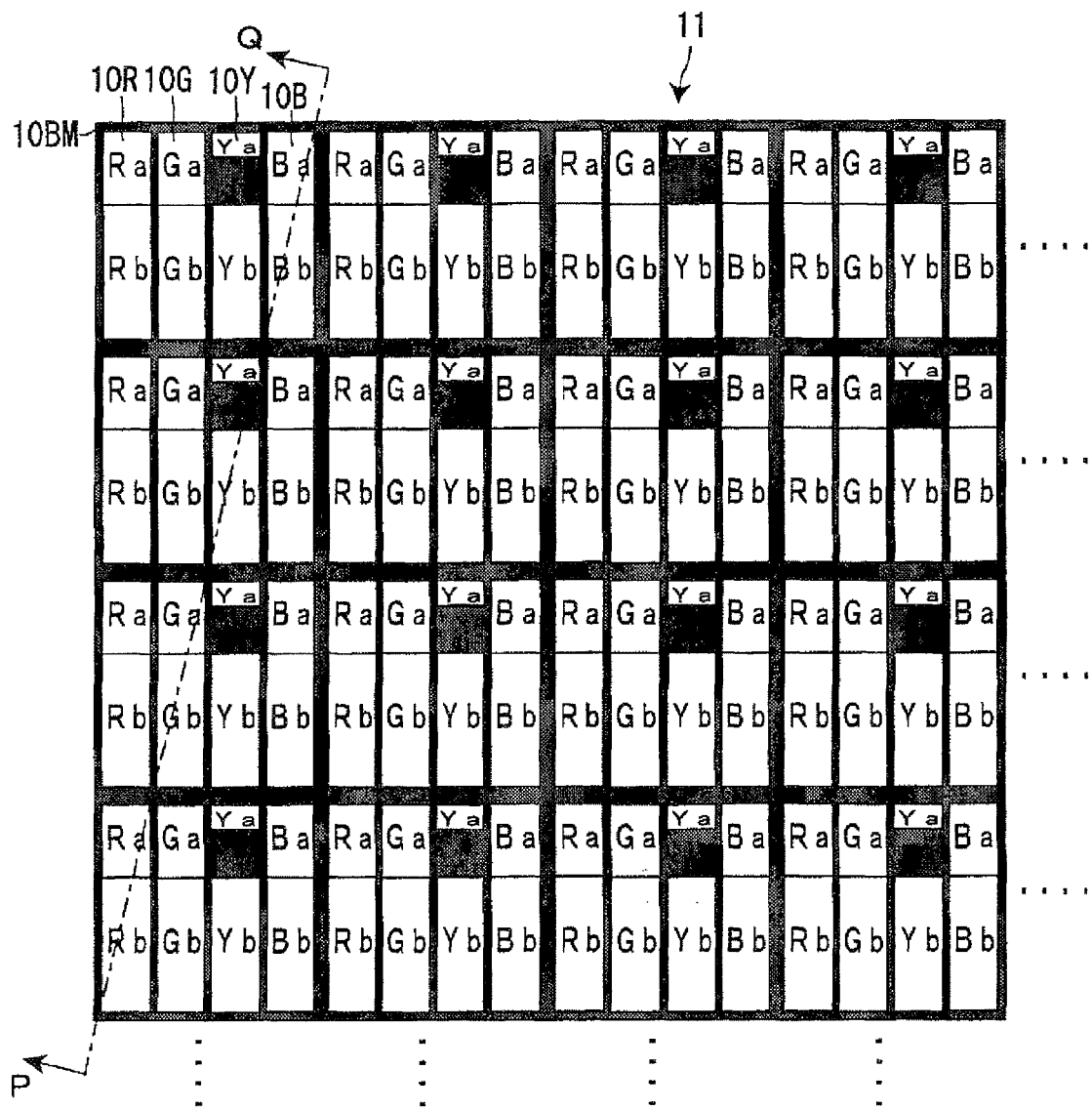
FIG. 7 is a planar view schematically showing a configuration of the color filter substrate (counter substrate) in the transflective display device in accordance with Embodiment 1 of the present invention.
Figure 8:
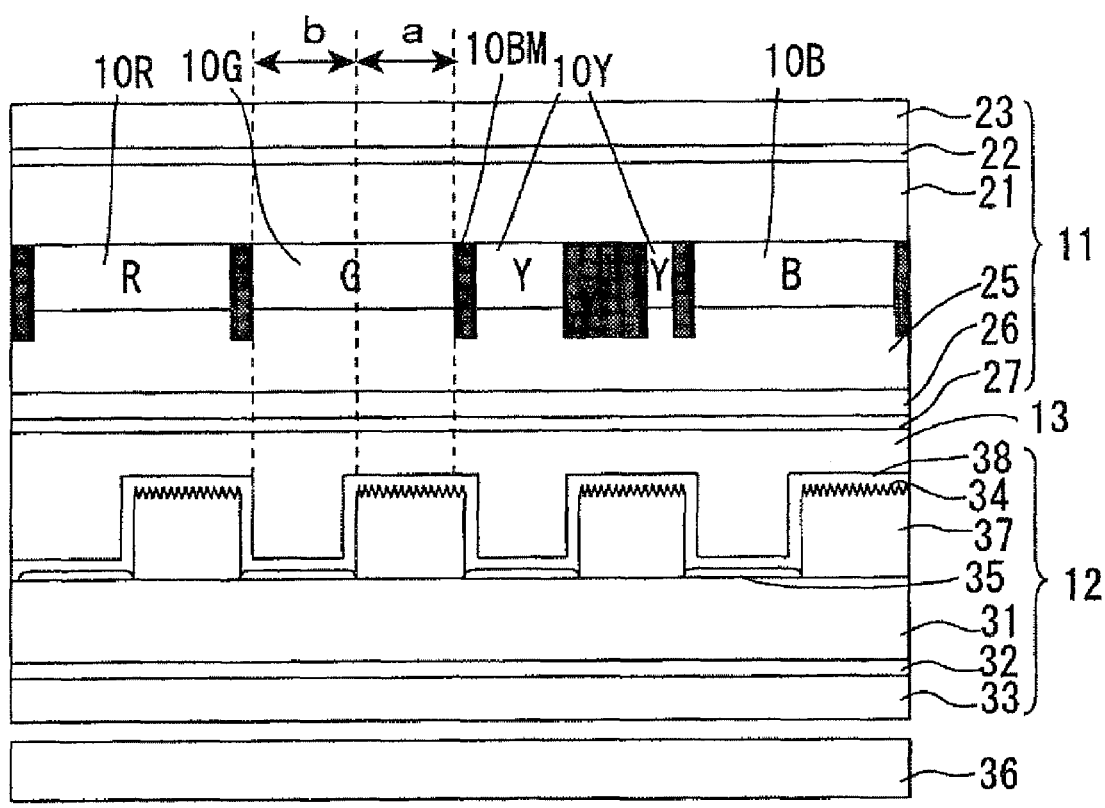
FIG. 8 is a schematic view showing a cross-section taken along line P-Q in FIGS. 6 and 7.
Figure 9:
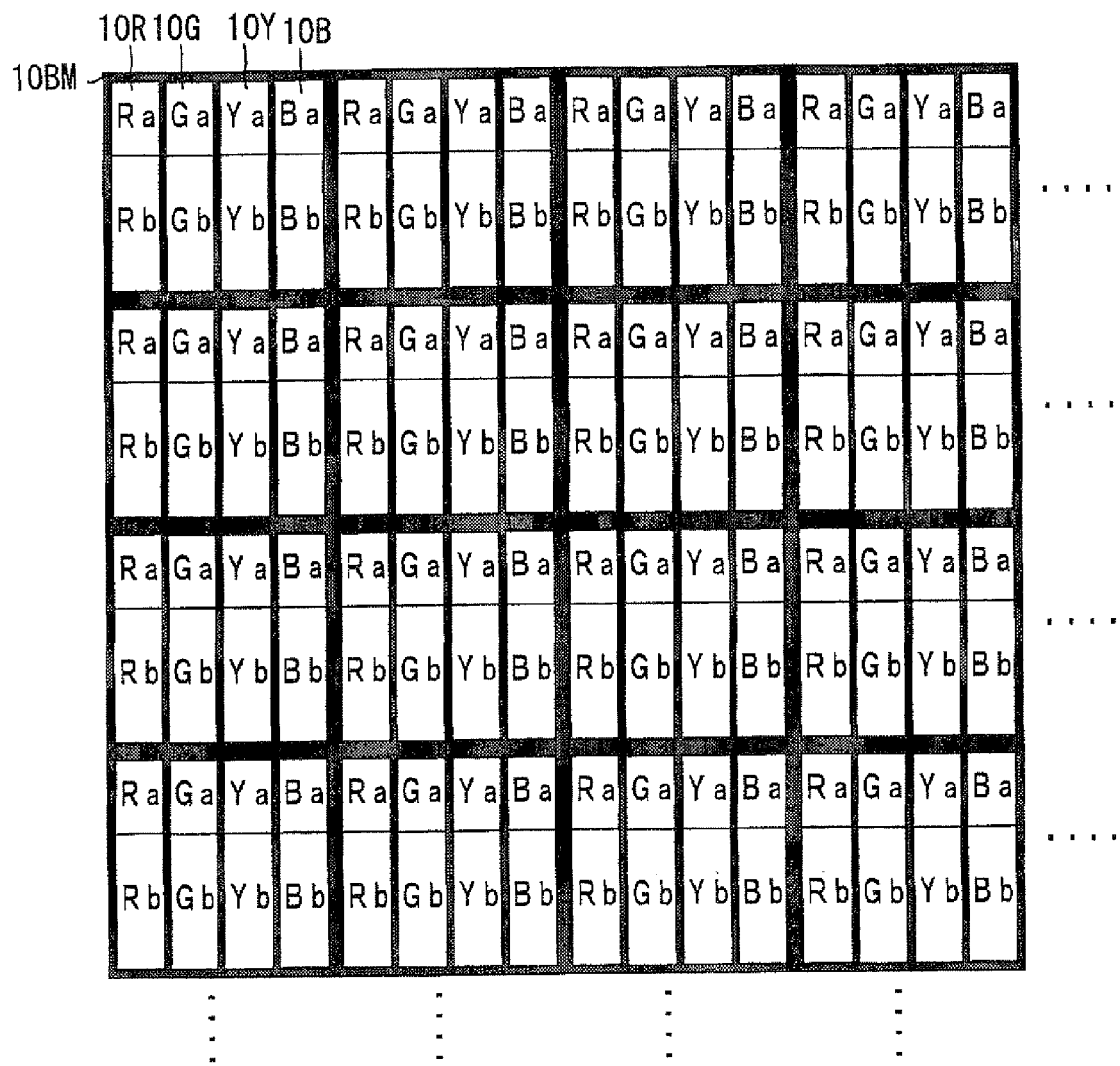
FIG. 9 is a planar view schematically showing a configuration of pixels in the conventional liquid crystal display device in Comparative Embodiment 1.
Figure 10:
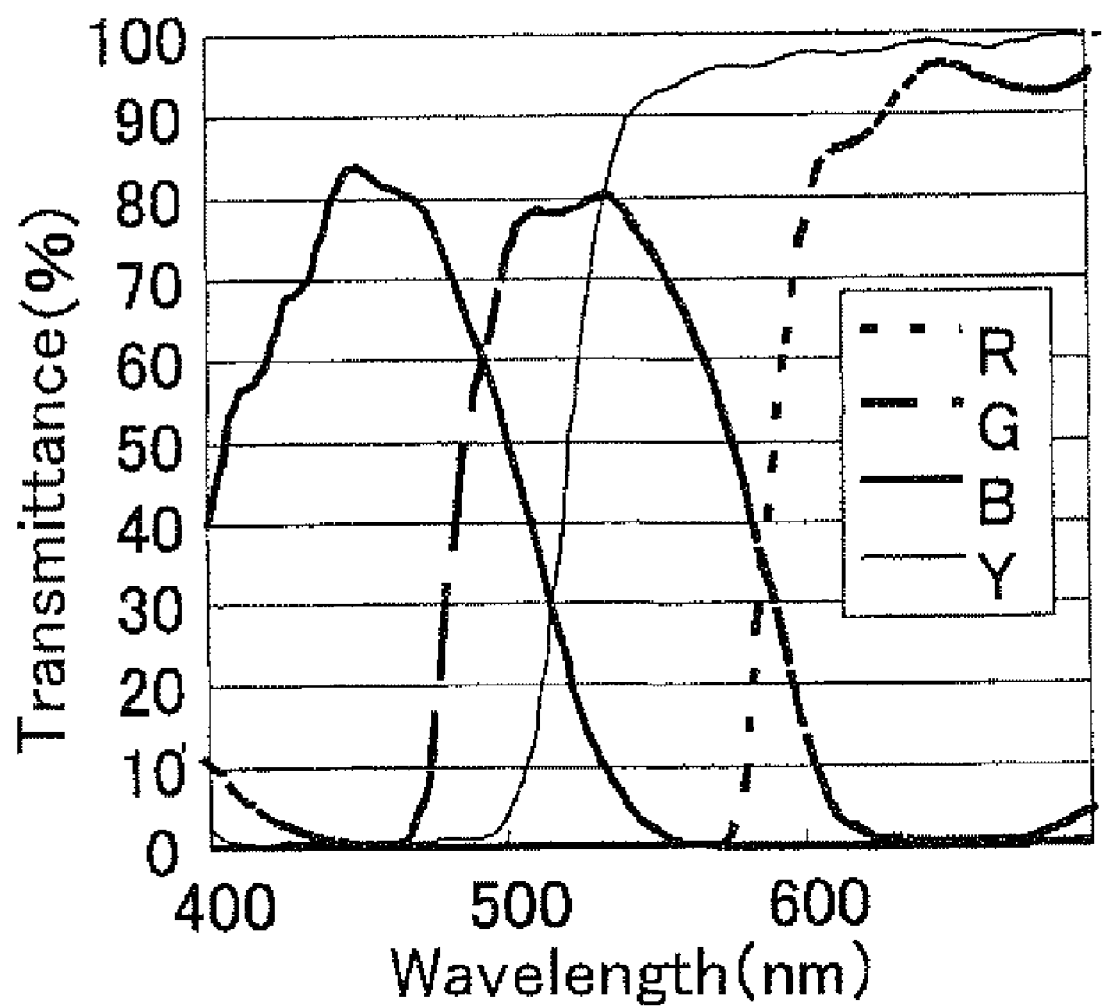
FIG. 10 is a graph showing spectral characteristics of a red filter, a green filter, a blue filter, and a yellow filter in accordance with the present Embodiments.
Figure 11:
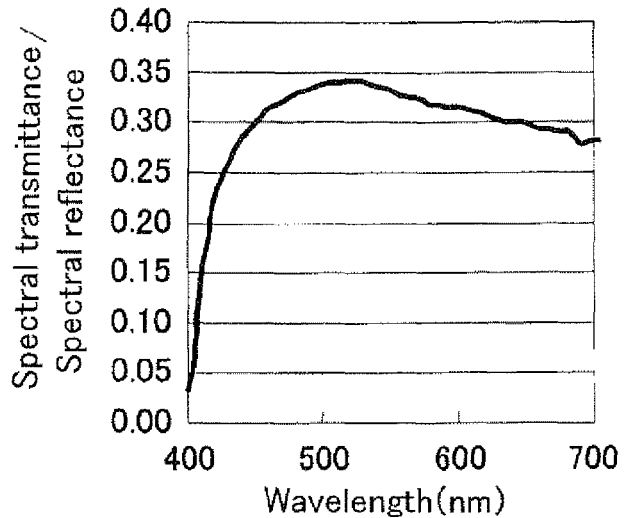
FIG. 11 is a graph showing a spectral transmittance and a spectral reflectance of the liquid crystal layer 13 in accordance with the present Embodiments.
Figure 12:
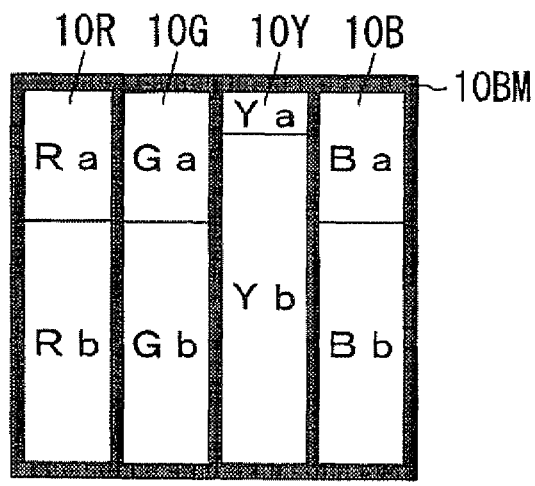
FIG. 12 is a planar view schematically showing a configuration of one pixel in the liquid crystal display device in accordance with Embodiment 2 of the present invention.
Figure 13:
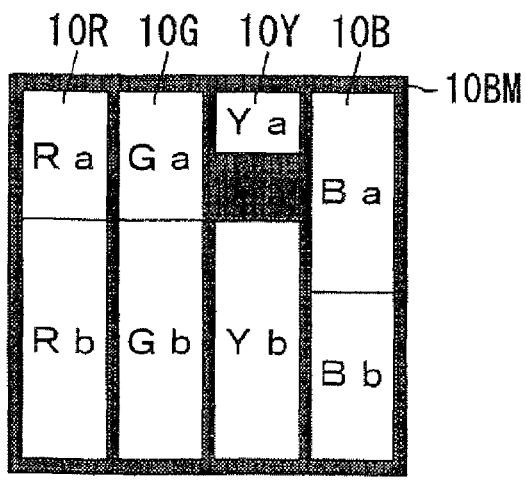
FIG. 13 is a planar view schematically showing a configuration of one pixel in the liquid crystal display device in accordance with Embodiment 3 of the present invention.
Figure 14:
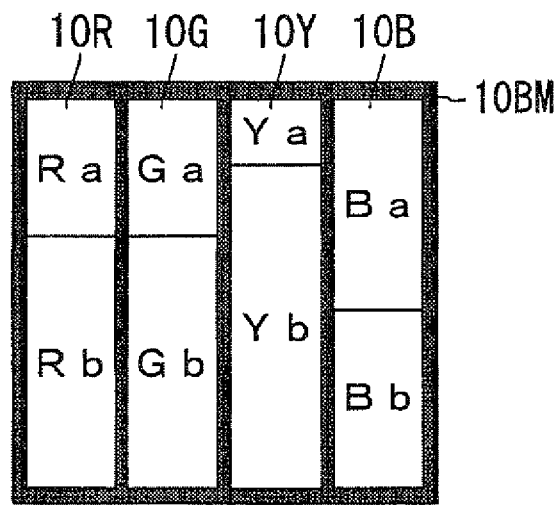
FIG. 14 is a planar view schematically showing a configuration of one pixel in the liquid crystal display device in accordance with Embodiment 4 of the present invention.
Figure 15:
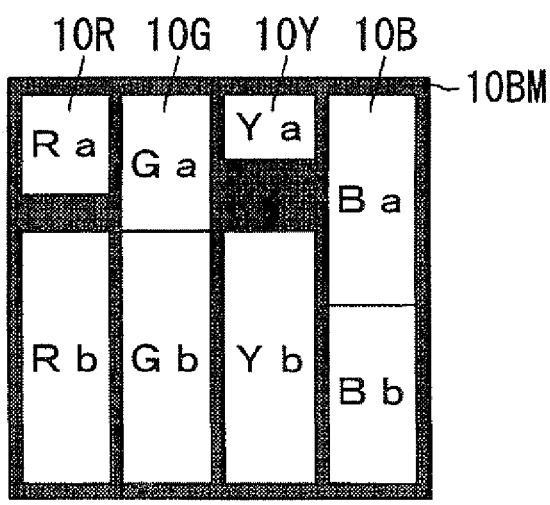
FIG. 15 is a planar view schematically showing a configuration of one pixel in the liquid crystal display device in accordance with Embodiment 5 of the present invention.
Figure 16:
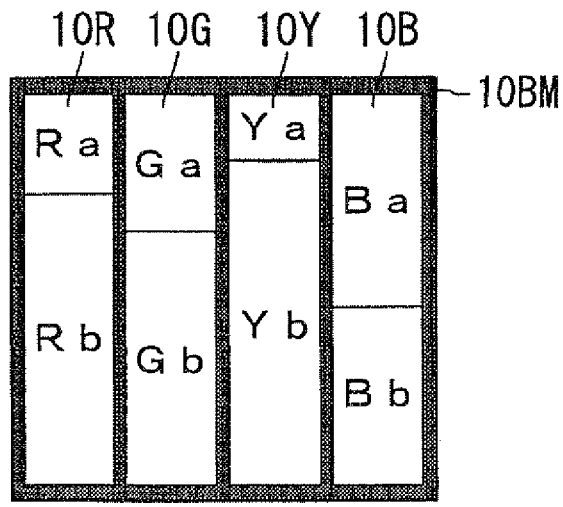
FIG. 16 is a planar view schematically showing a configuration of one pixel in the liquid crystal display device in accordance with Embodiment 6 of the present invention.
Figure 17:
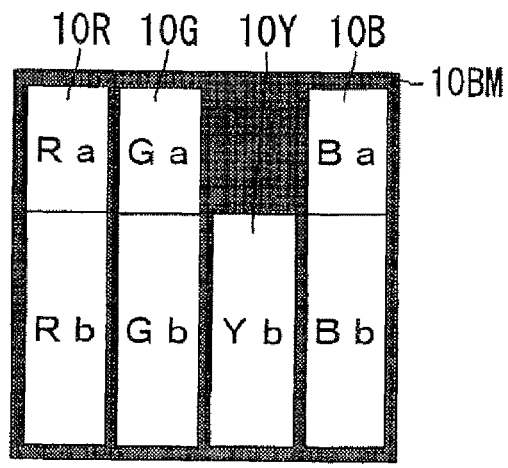
FIG. 17 is a planar view schematically showing a configuration of one pixel in the liquid crystal display device in accordance with Reference Embodiment 1 of the present invention.
Figure 18:
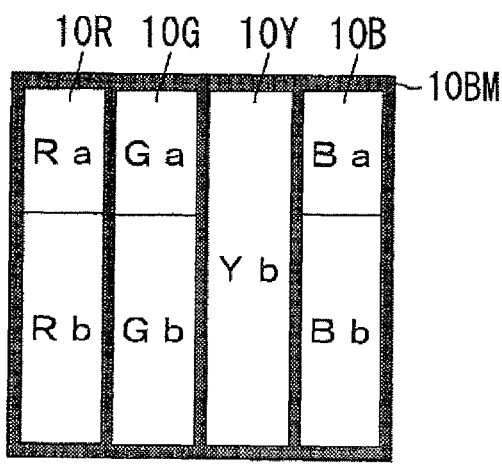
FIG. 18 is a planar view schematically showing a configuration of one pixel in the liquid crystal display device in accordance with Reference Embodiment 2 of the present invention.
Figure 19:
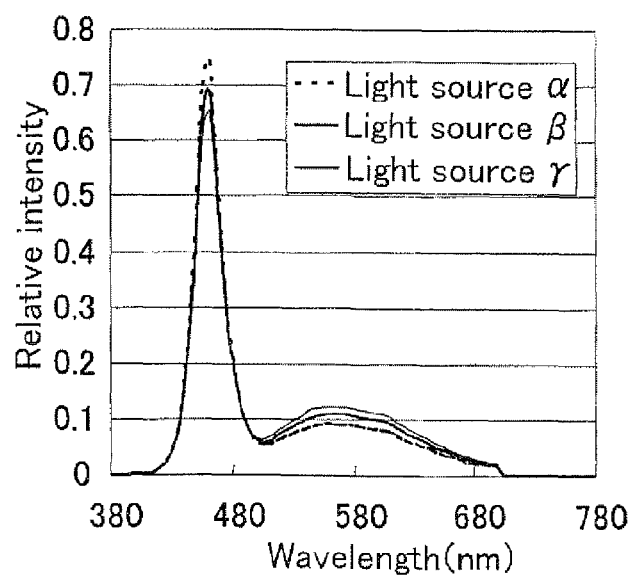
FIG. 19 is a diagram showing light-emitting spectrums of the light sources a to y in the backlight 36.
Figure 20:
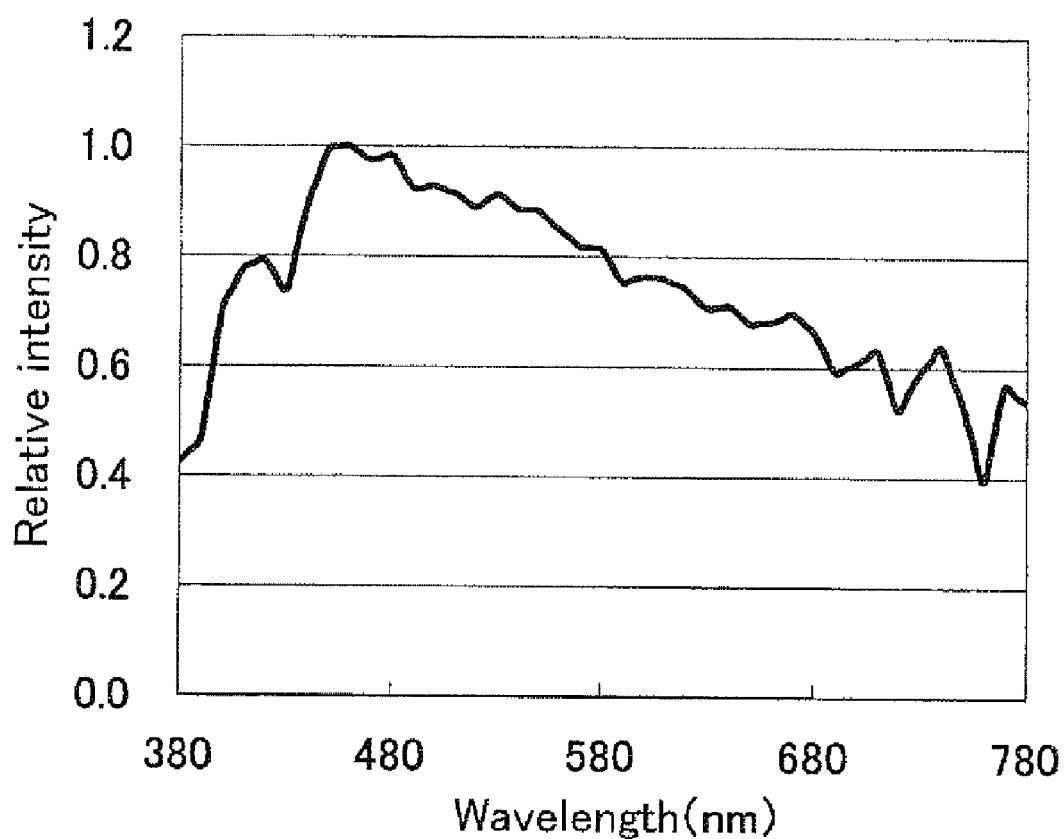
FIG. 20 is a diagram showing light-emitting spectrums of the light source $D_{65}$.
Figure 21:
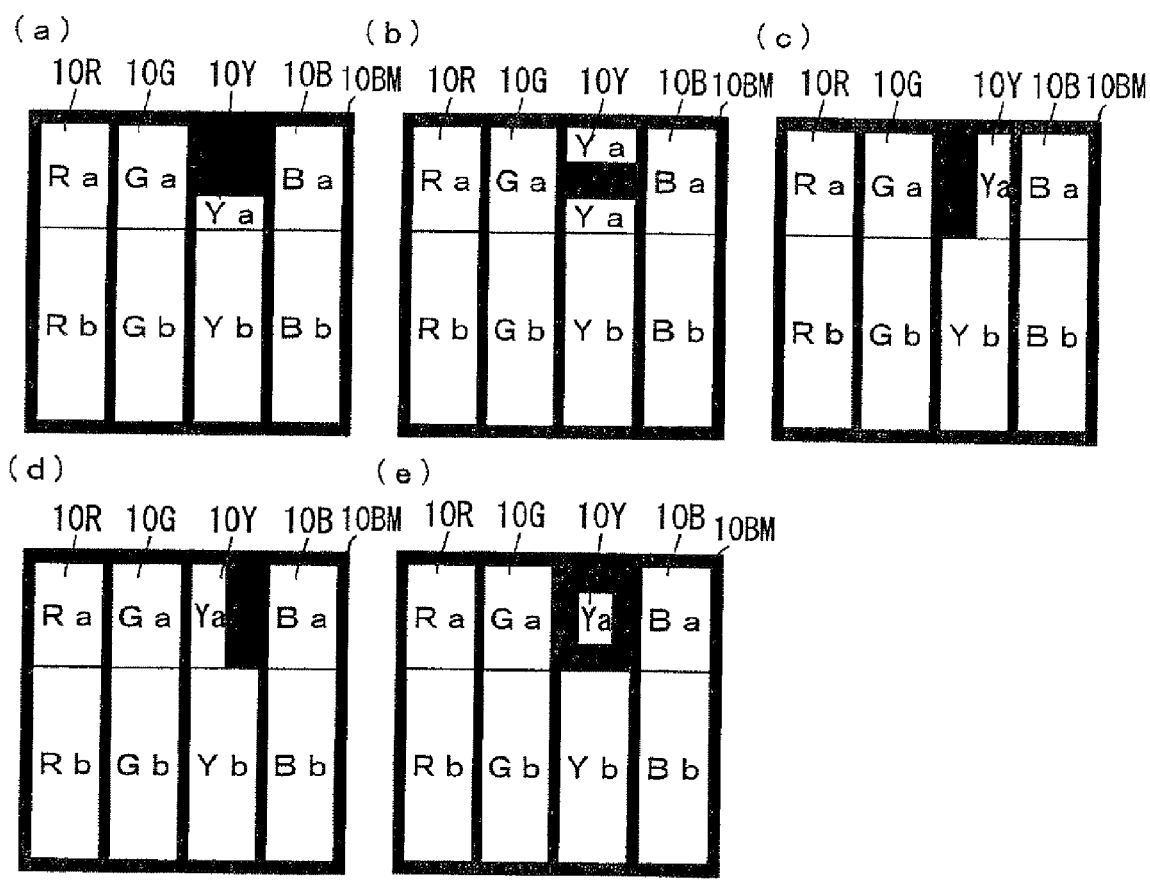
FIGS. 21(a) to 21(e) are planar views each showing a modified embodiment of Embodiment 1 of the present invention.
Figure 22:
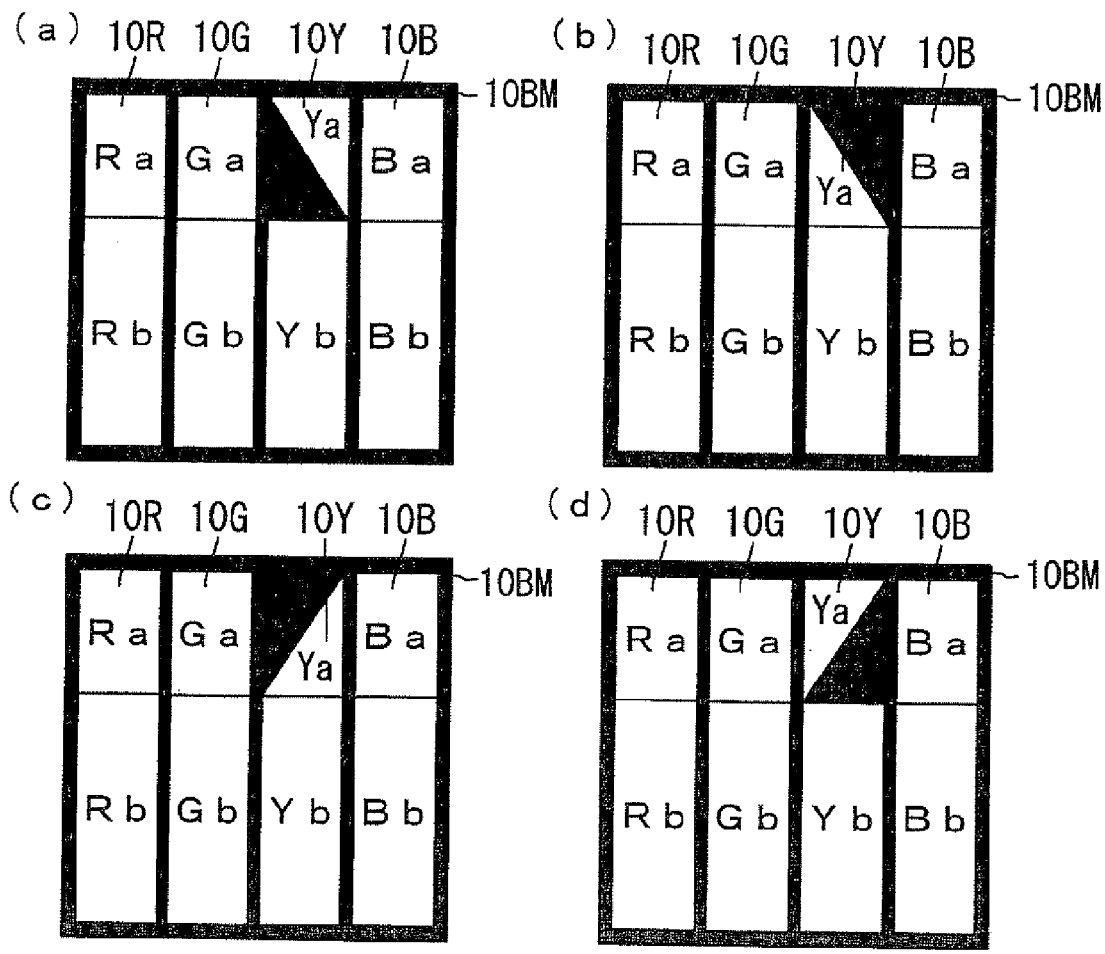
FIGS. 22(a) to 22(d) are planar views each showing a modified embodiment of Embodiment 1 of the present invention.
Figure 23:
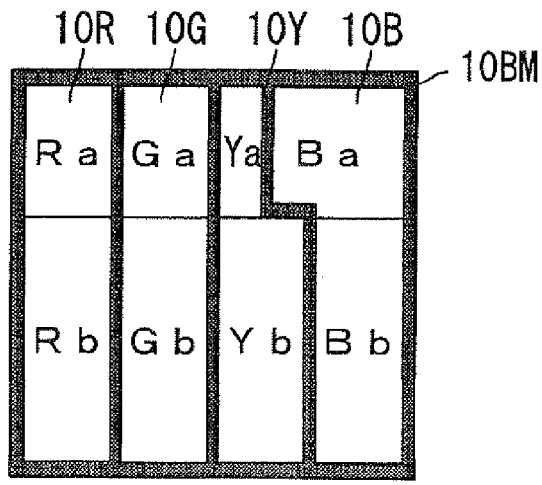
FIG. 23 is a planar view showing a modified embodiment of Embodiment 2 of the present invention.

| | |
|---|---|
| 5: | Source bus line |
| 6: | Gate bus line |
| 7: | Storage capacitance (Cs) wiring |
| 9: | Bank |
| 10R: | Red filter |
| 10G: | Green filter |
| 10B: | Blue filter |
| 10Y: | Yellow filter |
| 10BM: | Black matrix |
| 11: | Counter substrate |
| 12: | TFT substrate |
| 13: | Liquid crystal layer |
| 21: | Glass substrate |
| 22: | Retarder |
| 23: | Polarizer |
| 25: | Overcoat layer |
| 26: | Counter electrode |
| 27: | Alignment film |
| 31: | Glass substrate |
| 32: | Retarder |
| 33: | Polarizer |
| 34: | Reflective electrode |
| 35: | Transmissive electrode |
| 36: | Backlight |
| 37: | Projection |
| 38: | Alignment film |

-continued

| | |
|---|---|
| BA: | Bank |
| BM: | Black matrix (black part) |
| a: | Reflective region |
| b: | Transmissive region |
| Ra: | Reflective region in red filter |
| Rb: | Transmissive region in red filter |
| Ga: | Reflective region in green filter |
| Gb: | Transmission region in green filter |
| Ba: | Reflection region in green filter |
| Bb: | Transmission region in green filter |
| Ya: | Reflection region in yellow filter |
| Yb: | Transmission region in yellow filter |

The invention claimed is:

1. A transflective display device comprising;
four or more filters having different colors in a pixel,
each of the four or more filters in said pixel having different colors including: a transmissive region for displaying an image by transmitting light from a backlight; and a reflective region for displaying an image by reflecting surrounding light,
wherein at least two of the four or more filters having different colors are different in a proportion of an area of the reflective region,
the proportion of the area is represented by the following formula (1):

Proportion of area of reflective region=Area of reflective region/Effective area of filter    (1), wherein a shielding film is arranged to overlap with at least part of at least one of the four or more filters having different colors, or arranged instead of a part of at least one of the four or more filters having different colors
the at least two of the four or more filters having different colors are different in a proportion of an area of the shielding film, and
the proportion of the area is represented by the following formula (2) or formula (3):

Proportion of area of shielding film=Area of shielding film arranged to overlap with a part of filter/Effective area of filter, or    (2)

the proportion of the area is represented by the following formula: Proportion of area of shielding film=Area of shielding film arranged instead of a part of filter/Effective area of filter.    (3)

2. The transflective display device according to claim 1, wherein a reflective member is arranged in each of the four or more filters having different colors,
an area ratio of the reflective member to a transmissive electrode is different between the at least two of the four or more filters having different colors, and
the area ratio is represented by the following formula (4):

Area ratio of reflective member to transmissive electrode=Area of reflective member/Area of transmissive electrode    (4).

3. The transflective display device according to claim 1, wherein a red filter, a green filter, a blue filter, and a yellow filter are arranged in the pixel.

4. The transflective display device according to claim 3, wherein the yellow filter has a smaller proportion of the area of the reflective region, represented by the formula (1), than that of any one of the other filters.

5. The transflective display device according to claim 4, wherein the yellow filter has a smaller proportion of the area of the reflective region, represented by the formula (1), than that of the blue filter.

6. The transflective display device according to claim 5, wherein the yellow filter is arranged adjacent to the blue filter, and
an area of the reflective region in the blue filter is extended toward the reflective region in the yellow filter.

7. The transflective display device according to claim 5, wherein the yellow filter has a smaller proportion of the area of the reflective region, represented by the formula (1), than that of the green filter.

8. The transflective display device according to claim 7, wherein the yellow filter has the smallest proportion of the area of the reflective region, represented by the formula (1), among all of the filters.

9. The transflective display device according to claim 8, wherein the yellow filter has substantially the same proportion of an area of the transmissive region as that of each of the other filters, and the proportion of the area is represented by the following formula (5):

Proportion of area of transmissive region=Area of transmissive region/Effective area of filter    (5).

10. The transflective display device according to claim 8, wherein the yellow filter has the largest proportion of the area of the transmissive region among all of the filters, and
the proportion of the area is represented by the following formula (5):

Proportion of area of transmissive region=Area of transmissive region/Effective area of filter    (5).

11. The transflective display device according to claim 8, wherein the blue filter has the largest proportion of the area of the reflective region, represented by the formula (1), among all of the filters.

12. The transflective display device according to claim 8, wherein the red filter has a smaller proportion of the area of the reflective region, represented by the formula (1), than that of each of the green and blue filters.

13. The transflective display device according to claim 12, wherein the red filter has substantially the same proportion of the area of the transmissive region as that of the green filter, and
the proportion of the area is represented by the following formula (5):

Proportion of area of transmissive region=Area of transmissive region/Effective area of filter    (5).

14. The transflective display device according to claim 12, wherein the red filter has a larger proportion of the area of the transmissive region than that of the green filter, and the proportion of the area is represented by the following formula (5):

Proportion of area of transmissive region=Area of transmissive region/Effective area of filter    (5).

15. The transflective display device according to claim 11, wherein the proportion of the area of the reflective region, represented by the formula (1) is increased in order of the yellow filter, the red filter, the green filter, and the blue filter.

16. The transflective display device according to claim 3, wherein the red filter, the green filter, the yellow filter, and the blue filter are arranged in a stripe pattern in this order.

17. The transflective display device according to claim 1, wherein the transflective display device is a liquid crystal display device.

18. A transflective display device comprising:
four or more filters having different colors in a pixel, each of the four or more filters having different colors including: a transmissive region for displaying an image by transmitting light from a backlight; and a reflective region for displaying an image by reflecting surrounding light, wherein at least two of the four or more filters having different colors are different in an area of the reflective region, wherein a shielding film is arranged to overlap with a part of at least one of the four or more filters having different colors, or arranged instead of a part of at least one of the four or more filters, and wherein at least two of the four or more filters having different colors are different in an area of the shielding film.

19. The transflective display device according to claim 18, wherein a reflective member is arranged in each of the four or more filters having different colors, and an area of the reflective member is different between the at least two of the four or more filters having different colors.

20. The transflective display device according to claim 18, wherein a red filter, a green filter, a blue filter, and a yellow filter are arranged in the pixel.

21. The transflective display device according to claim 20, wherein the yellow filter has a smaller area of the reflective region than that of any one of the other filters.

22. The transflective display device according to claim 21, wherein the yellow filter has a smaller area of the reflective region than that of the blue filter.

23. The transflective display device according to claim 22, wherein the yellow filter is arranged adjacent to the blue filter, and an area of the reflective region in the blue filter is extended toward the reflective region in the yellow filter.

24. The transflective display device according to claim 22, wherein the yellow filter has a smaller area of the reflective region than that of the green filter.

25. The transflective display device according to claim 24, wherein the yellow filter has the smallest area of the reflective region among all of the filters.

26. The transflective display device according to claim 25, wherein the yellow filter has substantially the same area of the transmissive region as that of each of the other filters.

27. The transflective display device according to claim 25, wherein the yellow filter has the largest area of the transmissive region among all of the filters.

28. The transflective display device according to claim 25, wherein the blue filter has the largest area of the reflective region among all of the filters.

29. The transflective display device according to claim 25, wherein the red filter has a smaller area of the reflective region than that of each of the green and blue filters.

30. The transflective display device according to claim 29, wherein the red filter has substantially the same area of the transmissive region as that of the green filter.

31. The transflective display device according to claim 29, wherein the red filter has a larger area of the transmissive region than that of the green filter.

32. The transflective display device according to claim 28, wherein the area of the reflective region is increased in order of the yellow filter, the red filter, the green filter, and the blue filter.

33. The transflective display device according to claim 20, wherein the red filter, the green filter, the yellow filter, and the blue filter are arranged in a stripe pattern in this order.

34. The transflective display device according to claim 18, wherein the transflective display device is a liquid crystal display device.

35. A transflective display device comprising
three or more filters having different colors in a pixel,
each of the three or more filters having different colors including: a transmissive region for displaying an image by transmitting light from a backlight; and a reflective region for displaying an image by reflecting surrounding light, wherein a red filter, a green filter, and a blue filter are arranged in the pixel, the blue filter has a larger proportion of an area of the reflective region than that of any one of the three or more filters having different colors, and the proportion of the area is represented by the following formula (1):

Proportion of area of reflective region=Area of reflective region/Effective area of filter   (1), wherein a shielding film is arranged to overlap with at least part of at least one of the four or more filters having different colors, or arranged instead of a part of at least one of the four or more filters having different colors the at least two of the four or more filters having different colors are different in a proportion of an area of the shielding film, and the proportion of the area is represented by the following formula (2) or formula (3):

Proportion of area of shielding film=Area of shielding film arranged to overlap with a part of filter/Effective area of filter, or   (2)

the proportion of the area is represented by the following formula: Proportion of area of shielding film=Area of shielding film arranged instead of a part of filter/Effective area of filter.   (3)

36. A transflective display device comprising
three or more filters having different colors in a pixel,
each of the three or more filters having different colors including: a transmissive region for displaying an image by transmitting light from a backlight; and a reflective region for displaying an image by reflecting surrounding light, wherein a red filter, a green filter, and a blue filter are arranged in the pixel, the red filter has a smaller proportion of an area of the reflective region than that of any one of the three or more filters having different colors, and the proportion of the area is represented by the following formula (1):

Proportion of area of reflective region=Area of reflective region/Effective area of filter   (1), wherein a shielding film is arranged to overlap with at least part of at least one of the four or more filters having different colors, or arranged instead of a part of at least one of the four or more filters having different colors the at least two of the four or more filters having different colors are different in a proportion of an area of the shielding film, and the proportion of the area is represented by the following formula (2) or formula (3):

Proportion of area of shielding film=Area of shielding film arranged to overlap with a part of filter/Effective area of filter, or   (2)

the proportion of the area is represented by the following formula:

Proportion of area of shielding film=Area of shielding film arranged instead of a part of filter/Effective area of filter. (3)

37. A reflective display device comprising:
four or more filters having different colors in a pixel,
wherein at least two of the four or more filters having different colors are different in an effective area,
wherein a shielding film is arranged to overlap with a part of at least one of the four or more filters having different colors, or arranged instead of a part of at least one of the four or more filters, and
wherein at least two of the four or more filters having different colors are different in an area of the shielding film.

38. The reflective display device according to claim 37, wherein a reflective member is arranged in each of the four or more filters having different colors, and
an area of the reflective member is different between the at least two of the four or more filters having different colors.

39. The reflective display device according to claim 37, wherein a red filter, a green filter, a blue filter, and a yellow filter are arranged in the pixel.

40. The reflective display device according to claim 39, wherein the yellow filter has a smaller effective area than that of any one of the other filters.

41. The reflective display device according to claim 40, wherein the yellow filter has a smaller effective area than that of the blue filter.

42. The reflective display device according to claim 41, wherein the yellow filter is arranged adjacent to the blue filter, and an area of the reflective region in the blue filter is extended toward the reflective region in the yellow filter.

43. The reflective display device according to claim 41, wherein the yellow filter has a smaller effective area than that of the green filter.

44. The reflective display device according to claim 43, wherein the yellow filter has the smallest effective area among all of the filters.

45. The reflective display device according to claim 44, wherein the blue filter has the largest effective area among all of the filters.

46. The reflective display device according to claim 45, wherein the red filter has a smaller effective area than that of each of the green and blue filters.

47. The reflective display device according to claim 45, wherein the effective area is increased in order of the yellow filter, the red filter, the green filter, and the blue filter.

48. The reflective display device according to claim 39, wherein the red filter, the green filter, the yellow filter, and the blue filter are arranged in a stripe pattern in this order.

49. The reflective display device according to claim 37, wherein the reflective display device is a liquid crystal display device.

50. The device of claim 1, wherein at least two of the four or more filters in the pixel having different colors are different in a proportion of an area of the reflective region, and wherein a first reflective member facing a first of the two filters and a second reflective member facing the second of the two filters have approximately the same size and area.

51. The device of claim 18, wherein at least two of the four or more filters in the pixel having different colors are different in a proportion of an area of the reflective region, and wherein a first reflective member facing a first of the two filters and a second reflective member facing the second of the two filters have approximately the same size and area.

* * * * *